US 8,466,990 B2

(12) United States Patent
Nomoto et al.

(10) Patent No.: US 8,466,990 B2
(45) Date of Patent: Jun. 18, 2013

(54) IMAGING APPARATUS AND METHOD, ELECTRONIC DEVICE, AND PROGRAM

(75) Inventors: Kazuki Nomoto, Kanagawa (JP); Akihiro Nakamura, Kumamoto (JP); Takashi Kubodera, Kumamoto (JP); Kaneyoshi Takeshita, Tokyo (JP); Yukihiro Kiyota, Tokyo (JP)

(73) Assignee: Sony Corporation, Tokyo (JP)

( * ) Notice: Subject to any disclaimer, the term of this patent is extended or adjusted under 35 U.S.C. 154(b) by 335 days.

(21) Appl. No.: 12/805,520

(22) Filed: Aug. 4, 2010

(65) Prior Publication Data

US 2011/0102648 A1    May 5, 2011

(30) Foreign Application Priority Data

Sep. 18, 2009   (JP) ................................. 2009-217719

(51) Int. Cl.
  *H04N 5/217*   (2011.01)
  *H04N 5/228*   (2006.01)
  *H04N 9/64*    (2006.01)
  *H04N 3/14*    (2006.01)
  *H04N 5/335*   (2011.01)

(52) U.S. Cl.
  USPC ........ 348/241; 348/222.1; 348/243; 348/246; 348/247; 348/294

(58) Field of Classification Search
  USPC .............. 348/207.99–207.1, 222.1, 241–251, 348/294–324; 382/274–275; 250/208.1
  See application file for complete search history.

(56) References Cited

U.S. PATENT DOCUMENTS

| 5,047,863 | A  | * | 9/1991  | Pape et al. .................... 348/247 |
| 6,061,092 | A  | * | 5/2000  | Bakhle et al. ................. 348/243 |
| 6,737,625 | B2 | * | 5/2004  | Baharav et al. ............ 250/208.1 |
| 7,280,141 | B1 | * | 10/2007 | Frank et al. ................... 348/243 |
| 2002/0008766 | A1 | * | 1/2002  | Tariki ........................... 348/243 |
| 2002/0176013 | A1 | * | 11/2002 | Itoh ............................. 348/243 |
| 2003/0128285 | A1 | * | 7/2003  | Itoh ............................. 348/246 |
| 2004/0263648 | A1 | * | 12/2004 | Mouli .......................... 348/243 |
| 2006/0256215 | A1 | * | 11/2006 | Zhang et al. ................. 348/243 |
| 2007/0035642 | A1 | * | 2/2007  | Takahashi et al. ............ 348/241 |
| 2007/0146508 | A1 | * | 6/2007  | Oshima ........................ 348/243 |
| 2008/0106619 | A1 | * | 5/2008  | Sumiya ........................ 348/246 |

FOREIGN PATENT DOCUMENTS

| JP | 2003-230045 | 8/2003 |
| JP | 2007-143120 | 6/2007 |

* cited by examiner

*Primary Examiner* — Michael Osinski
(74) *Attorney, Agent, or Firm* — Rader, Fishman & Grauer PLLC

(57) ABSTRACT

An imaging apparatus includes: an imaging unit configured to image an image using an imaging device; an image obtaining unit configured to obtain a plurality of images equivalent to the time of dark, imaged by the imaging unit; a registering unit configured to register, with an image obtained by the image obtaining unit, the address and change amount of a pixel where the output value of the pixel changes so as to exceed a predetermined threshold; and a correcting unit configured to correct, when taking a pixel corresponding to an address registered by the registering unit as a processing object pixel, the pixel value of the processing object pixel based on comparison between difference of the output values of the processing object pixel and a peripheral pixel of the processing object pixel, and the change amount of the processing object pixel.

19 Claims, 13 Drawing Sheets

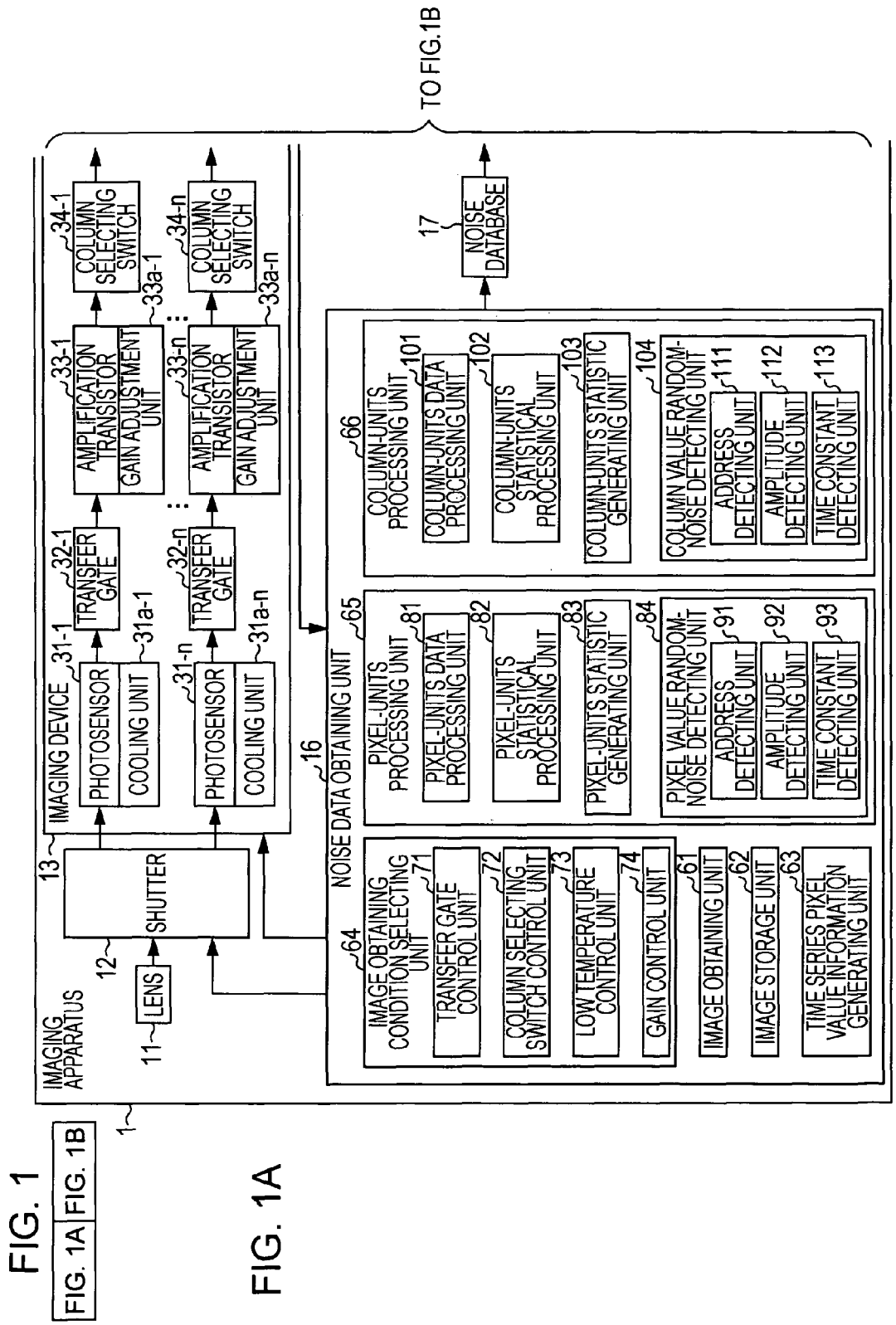

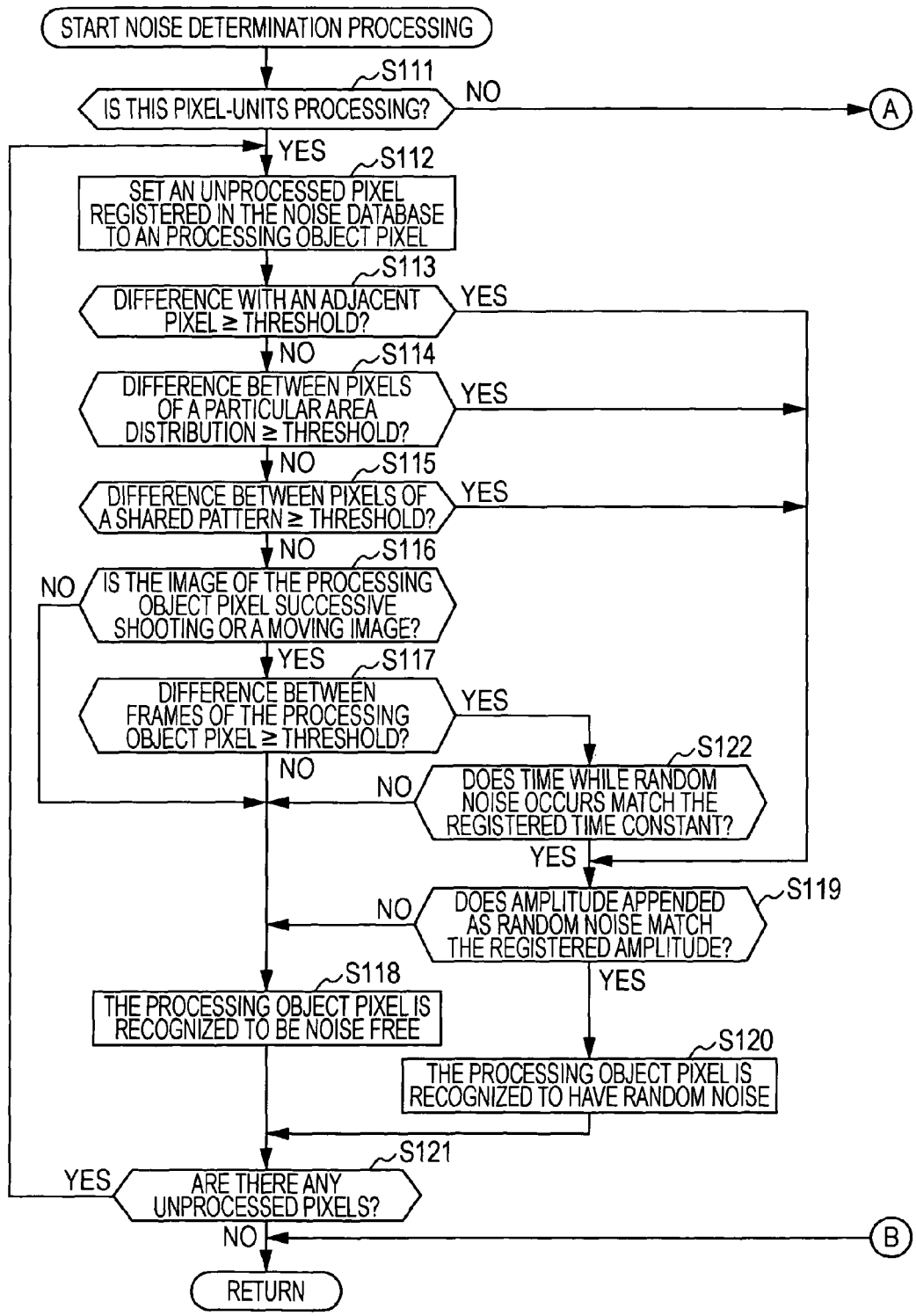

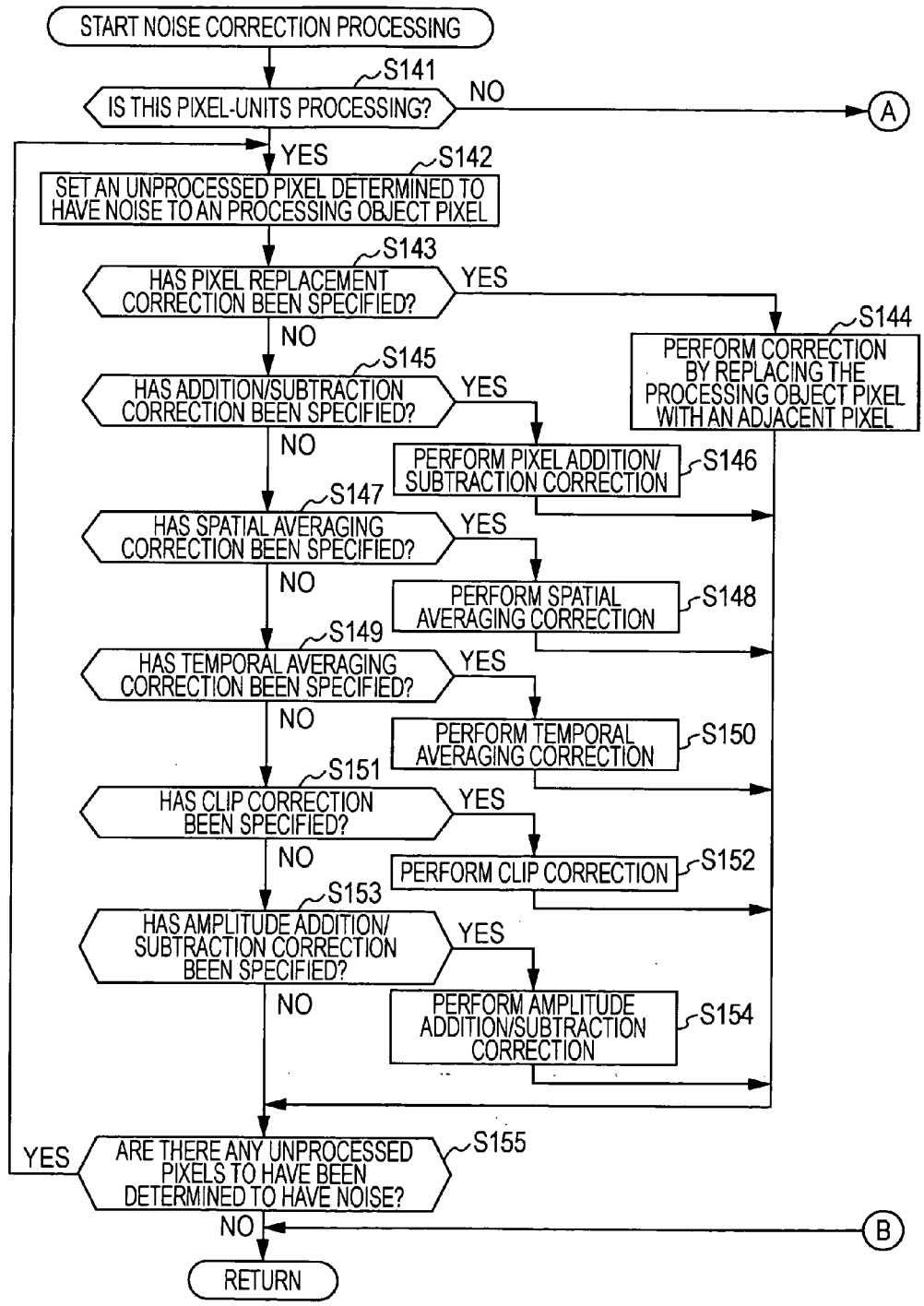

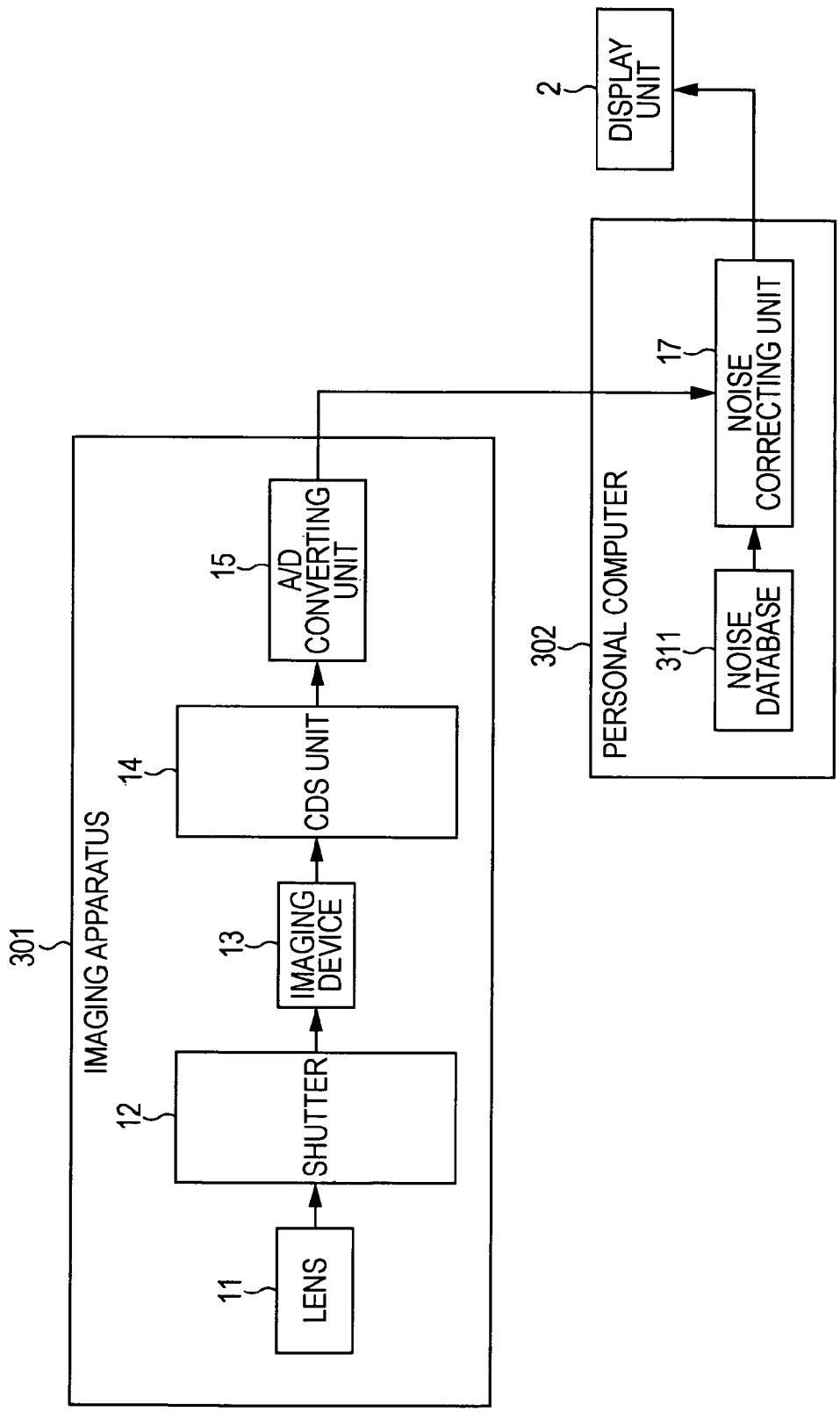

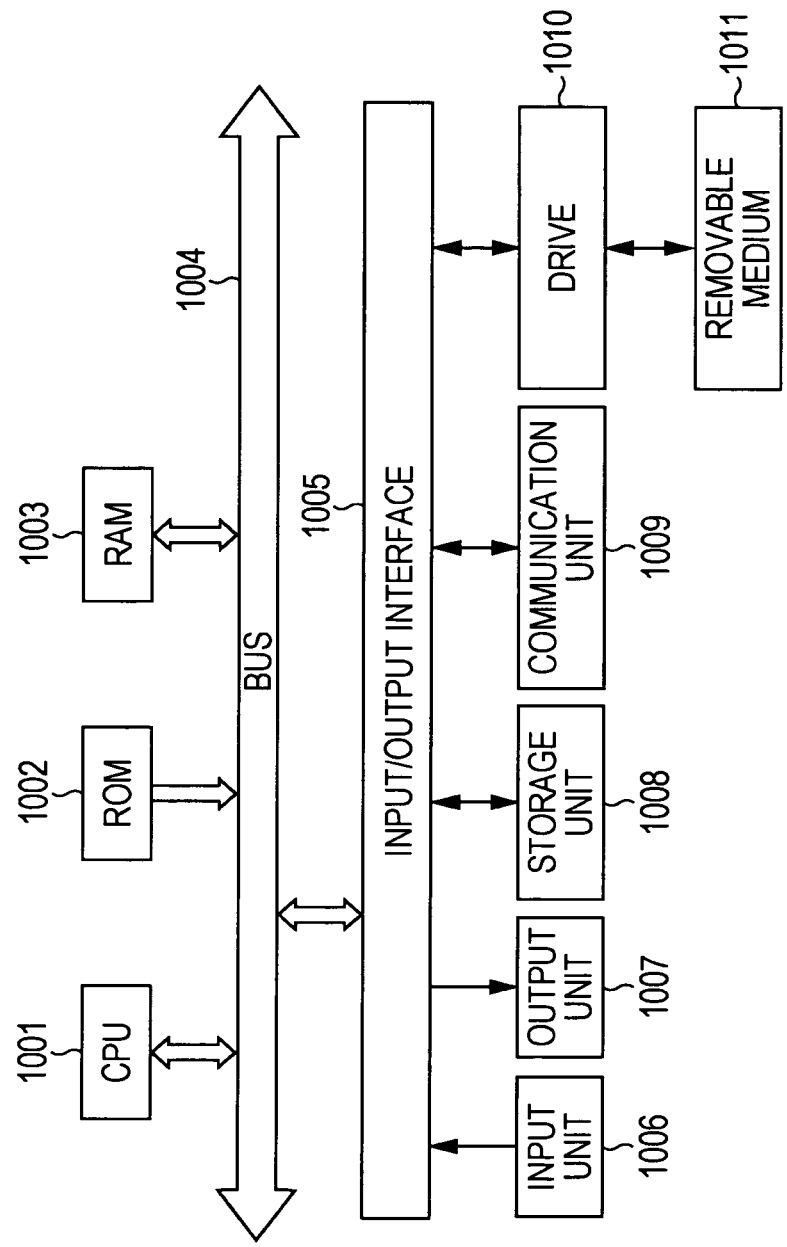

IMAGING APPARATUS AND METHOD, ELECTRONIC DEVICE, AND PROGRAM

BACKGROUND OF THE INVENTION

1. Field of the Invention

The present invention relates to an imaging apparatus and method, an electronic device, and a program, and specifically relates to an imaging apparatus and method, an electronic device, and a program, whereby noise due to a defective pixel outputting a peculiar-level signal at random depending on the properties of individual transistors to be used at a CMOS (Complementary Metal Oxide Semiconductor) solid-state imaging device made up of a semiconductor can be reduced.

2. Description of the Related Art

In the event of fixed-patterned noise which outputs a signal having a constant level, noise output for each pixel from an imaged image is reduced, whereby the image can be corrected. However, with a defect wherein a peculiar-level signal is output at random such as random noise, when performing subtraction of a particular value that is a method for correcting fixed-patterned noise, this causes a problem in the case where no random noise has occurred that the image is excessively corrected.

Also, a method has been proposed wherein pixel values within a particular region are compared within the region, a pixel having a peculiar output level is determined to be noise, and is subjected to smoothing, thereby reducing the noise (see Japanese Unexamined Patent Application Publication No. 2007-143120).

Also, separately from smoothing, a method for creating a simple background image with shooting in succession has been proposed (see Japanese Unexamined Patent Application Publication No. 2003-230045), and as a secondary effect thereof, removal of random noise from a background image can be conceived to be enabled. Specifically, this is a method for making up a histogram from the pixel values of successive shots, and simply creating a background by employing the most frequent value for each pixel of a background image.

SUMMARY OF THE INVENTION

However, in the case of Japanese Unexamined Patent Application Publication No. 2007-143120, existence of random noise is determined from difference with an adjacent pixel, and accordingly, even when a pixel where random noise occurs has small difference with an adjacent pixel, this may not exceed a threshold, and may be determined not to be random noise. Conversely, in the event that difference with an adjacent pixel of a pixel value including random noise is greater than the threshold, random noise can be determined, but the pixel including the random noise is corrected by smoothing, and accordingly, smoothing is performed in a state in which the random noise is included, and a correction value is obtained therefrom. As a result thereof, noise may not completely be eliminated, and also this may cause resolution to deteriorate.

Also, in the case of Japanese Unexamined Patent Application Publication No. 2003-230045, a threshold as to difference between the pixel values of adjacent pixels is set, a pixel of which the difference exceeds the threshold is regarded as a pixel of a region having motion, and a pixel of which the difference does not exceed the threshold is determined to be a pixel of a background image having no motion. Accordingly, the region having motion is excluded from a calculation processing object employing the most frequent value, and if random noise has occurred, the random noise is output as it is.

Also, with a background image as well, in the case that the time constant of random noise that takes a binary is the same as continuous shooting speed, when the most frequent value is employed, the image to or from which output of an amount equivalent to the amplitude thereof is added or subtracted is output, and consequently, the random noise is not completely eliminated even with this method.

It has been found to be desirable to enable reduction of noise, due to a defective pixel which outputs a peculiar-level signal at random, according to the properties of individual transistors to be used at a CMOS solid-state imaging device formed of a semiconductor.

An imaging apparatus according to an embodiment of the present invention is an imaging apparatus including: an imaging unit configured to image an image using an imaging device; an image obtaining unit configured to obtain a plurality of images equivalent to the time of dark, imaged by the imaging unit; a registering unit configured to register, with an image obtained by the image obtaining unit, the address and change amount of a pixel where the output value of the pixel changes so as to exceed a predetermined threshold; and a correcting unit configured to correct, when taking a pixel corresponding to an address registered by the registering unit as a processing object pixel, the pixel value of the processing object pixel based on comparison between difference of the output values of the processing object pixel and a peripheral pixel of the processing object pixel, and the change amount of the processing object pixel.

The image obtaining unit may obtain a plurality of images at the time of dark, imaged by the imaging unit.

The imaging apparatus may further include: a generating unit configured to generate, with an image obtained by the image obtaining unit, the pixel value of a pixel, and a statistical processing value using the pixel value in pixel units; and a detecting unit configured to detect a pixel which transmits a peculiar signal based on the pixel value and the statistical processing value, generated by the generating unit; with the image obtaining unit changing a transfer gate of the imaging device to an off state to obtain a plurality of images at the time of dark; and with the registering unit registering change amount made up of the amplitude of a pixel including the peculiar signal, and a time constant at which the peculiar signal is generated, in a manner correlated with an address for determining the pixel in pixel units where the peculiar signal detected by the detecting unit has been detected, as a database.

The image obtaining unit may turn a transfer gate of the imaging device to an off state to obtain a plurality of images at the time of dark; with the generating unit generating, with an image obtained by the image obtaining unit, the pixel value of a pixel, and a statistical processing value using the pixel value in column units; with the detecting unit detecting a pixel transmitting a peculiar signal based on the pixel value, and the statistical processing value in column units, generated by the generating unit; and with the registering unit registering the amplitude of a pixel including the peculiar signal, and a time constant at which the peculiar signal is generated, in a manner correlated with an address for determining the pixel in column units where the peculiar signal detected by the detecting unit has been detected, as a database.

The image obtaining unit may obtain a plurality of images equivalent to the time of dark at the time of low temperature by the imaging unit.

The imaging apparatus may further include: a determining unit configured to determine, when taking a pixel corresponding to an address registered in the database as a processing object, based on information registered in a manner correlated with the database, existence of the peculiar signal based on whether or not the pixel value of the processing object pixel exceeds a predetermined threshold set to a statistical processing value, or whether or not difference between the pixel values of the adjacent pixels exceeds the amplitude registered in the database or a predetermined threshold.

The determining unit may determine, when taking a pixel corresponding to an address registered in the database as a processing object, existence of the peculiar signal based on whether or not the difference between the pixel values of the adjacent pixels exceeds a predetermine threshold, whether or not difference between the patterns of pixels having a predetermined positional relation corresponding to the pixel serving as the processing object exceeds a predetermined threshold, or whether or not difference between the pixels of frames or fields exceeds a predetermined threshold at the time of continuous shootings and at the time of a moving image.

The determining unit may determine, when taking a pixel in a column corresponding to an address registered in the database as a processing object, based on information registered in the database in a manner correlated with the address, existence of the peculiar signal based on whether or not the pixel value of the pixel in the processing object column exceed a predetermined threshold set to a statistical processing value, or whether or not the difference between the pixel values of pixels in the adjacent columns exceeds the amplitude registered in the database or a predetermined threshold.

The determining unit may determine, when taking a pixel in a column corresponding to an address registered in the database as a processing object, existence of the peculiar signal based on whether or not difference between the pixel values of pixels in the adjacent columns exceeds a predetermined threshold, whether or not difference between the patterns of pixels in columns having a predetermined positional relation corresponding to the pixel of the column serving as the processing object exceeds a predetermined threshold, whether or not difference between pixels in the columns of frames or fields exceeds a predetermined threshold, whether or not difference between pixels of the same position in adjacent columns exceeds a predetermined threshold, whether or not difference between pixels vertically adjacent to the vertical direction of the pixel in the column exceeds a predetermined threshold, or whether or not the pattern in the vertical direction of the pixel values of the pixels of the columns greatly differs exceeding a predetermined threshold within a predetermined range.

The correcting unit may correct the pixel value of a pixel determined to have the peculiar signal by addition/subtraction processing using a correction value obtained by being corrected with luminance using the value of the amplitude registered in the database, replacement with the pixel value of an adjacent pixel, addition/subtraction of the output of an adjacent pixel, spatial averaging, temporal averaging, or clip processing to a predetermined value.

The correcting unit may correct the pixel value of a pixel in the column units determined to have the peculiar signal, or the pixel of a location where the peculiar signal occurs within the column.

The correcting unit may correct, based on the information registered in the database, a pixel value by complementing the pixel of the column unit determined to have the peculiar signal with an adjacent column, or by performing addition/subtraction processing using the amplitude registered in the database.

The correcting unit may correct, with correction as to a location where a peculiar signal occurs within the column, the pixel value of a pixel determined to have the peculiar signal by complementation with the same location as an adjacent column, addition/subtraction of the output of the same location as an adjacent column, spatial averaging, temporal averaging, clip processing to a particular value.

An information processing device may include: a database in which, in a manner correlated with an address determining a pixel where a peculiar signal has been detected, the amplitude of a pixel including the peculiar signal, and a time constant where the peculiar signal occurs are registered by the registering unit; a determining unit configured to determine, when taking a pixel corresponding to an address registered in the database as a processing object regarding an imaged image imaged by the imaging unit, existence of the peculiar signal based on the distribution of the pixel value of a pixel having a predetermined positional relation corresponding to the processing object pixel, or difference between the pixel values of adjacent pixels; and a correcting unit configured to correct the pixel value of a pixel determined to have a particular signal by the determining unit.

An imaging method according to an embodiment of the present invention is an imaging method including the steps of: imaging of an image using an imaging device; obtaining of a plurality of images equivalent to the time of dark, imaged in the imaging; registering, with an image obtained in the obtaining, of the address and change amount of a pixel where the output value of the pixel changes so as to exceed a predetermined threshold; and correcting, when taking a pixel corresponding to an address registered in the registering as a processing object pixel, of the pixel value of the processing object pixel based on comparison between difference of the output values of the processing object pixel and a peripheral pixel of the processing object pixel, and the change amount of the processing object pixel.

A program according to an embodiment of the present invention is a program causing a computer to execute processing including the steps of: imaging of an image using an imaging device; obtaining of a plurality of images equivalent to the time of dark, imaged in the imaging; registering, with an image obtained in the obtaining, of the address and change amount of a pixel where the output value of the pixel changes so as to exceed a predetermined threshold; and correcting, when taking a pixel corresponding to an address registered in the registering as a processing object pixel, of the pixel value of the processing object pixel based on comparison between difference of the output values of the processing object pixel and a peripheral pixel of the processing object pixel, and the change amount of the processing object pixel.

An electric device according to an embodiment of the present invention is an electronic device including: an imaging unit configured to image an image using an imaging device; an image obtaining unit configured to obtain a plurality of images equivalent to the time of dark, imaged by the imaging unit; a registering unit configured to register, with an image obtained by the image obtaining unit, the address and change amount of a pixel where the output value of the pixel changes so as to exceed a predetermined threshold; and a correcting unit configured to correct, when taking a pixel corresponding to an address registered by the registering unit as a processing object pixel, the pixel value of the processing object pixel based on comparison between difference of the output values of the processing object pixel and a peripheral pixel of the processing object pixel, and the change amount of the processing object pixel.

The imaging apparatus may be an independent device or may be a block for performing imaging processing.

According to the above configurations, with a CMOS solid-state imaging device formed of a semiconductor, even though a defective pixel outputting a peculiar-level signal at random may be caused due to the properties of individual transistors to be used, noise due to this defective pixel can be reduced.

BRIEF DESCRIPTION OF THE DRAWINGS

FIG. 9 is a diagram for describing an example wherein a noise database alone is housed in a personal computer, and is processed; and FIG. 10 is a diagram for describing a configuration example of the personal computer.

DESCRIPTION OF THE PREFERRED EMBODIMENTS

Hereafter, optimal modes for implementing the present invention (hereafter, referred to as "embodiments") will be described. Note that description will be made in accordance with the following sequence.
1. First Embodiment (Imaging Apparatus Alone)
2. Second Embodiment (Imaging Apparatus and Information Processing Device)

1. First Embodiment

Configuration Example of Imaging Apparatus

Figure 1B:
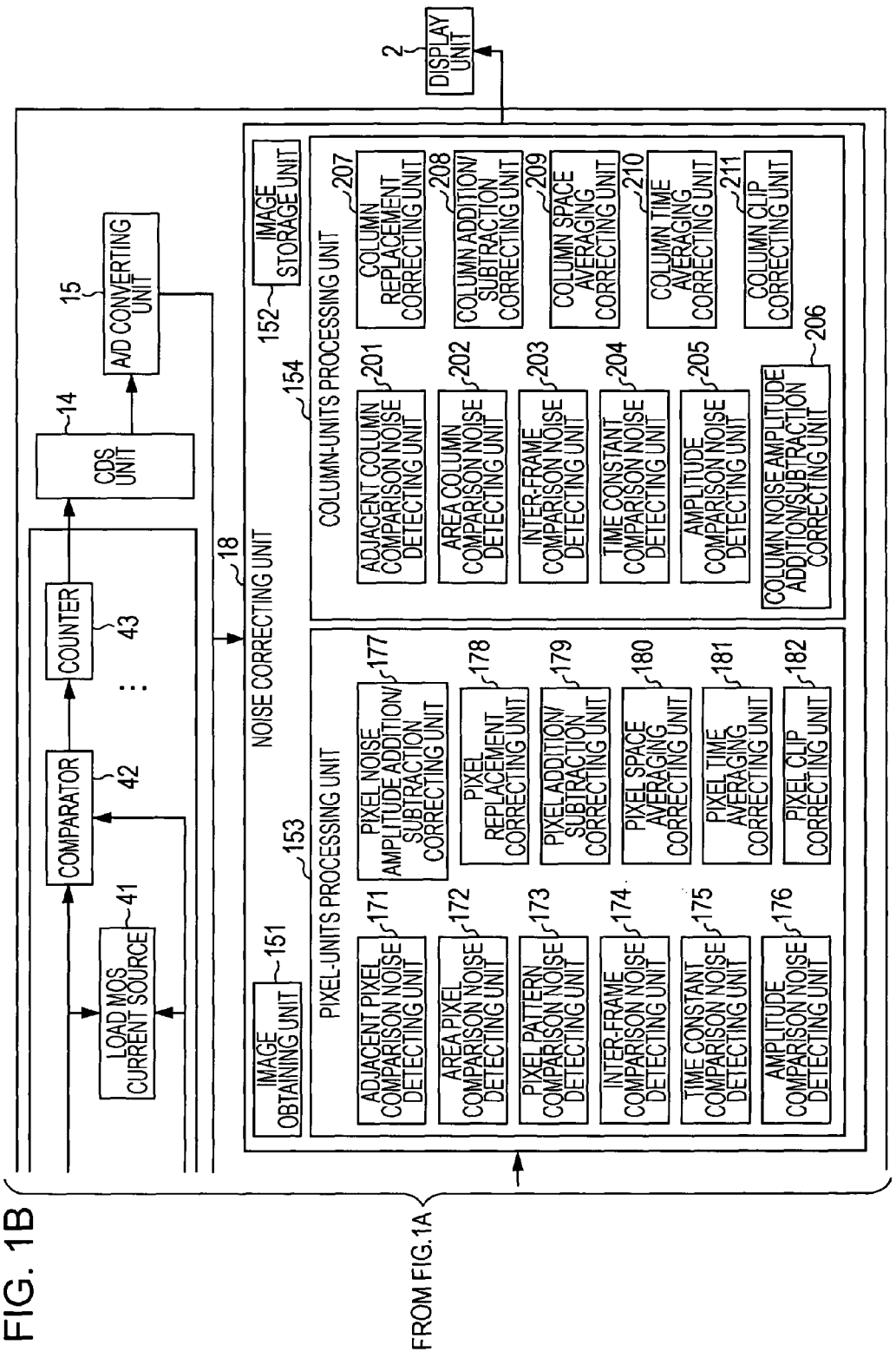
FIG. 1 is a diagram illustrating a configuration example of an imaging apparatus to which the present invention has been applied.

FIG. 1 is an imaging apparatus illustrating a configuration example of an embodiment to which the present invention has been applied.

The imaging apparatus 1 in FIG. 1 images an image equivalent to the time of dark beforehand, detects random noise that is a peculiar signal from the image imaged at that time, and registers this as a noise database beforehand. Subsequently, at the time of imaging a normal image, in the event that random noise has been detected, the imaging apparatus 1 corrects the random noise using the information of the random noise registered in the noise database. As a result thereof, the image imaged by the imaging apparatus 1 becomes an image of which the random noise that is a peculiar signal has been reduced.

The imaging apparatus 1 is configured of a lens 11, a shutter 12, an imaging device 13, a CDS (Correlated Double Sampling) unit 14, an A/D (Analog/Digital) converting unit 15, a noise obtaining unit 16, a noise database 17, and a noise correcting unit 18. The lens 11 subjects light from an unshown subject to optical processing, and inputs this to the shutter 12. The shutter 12 controls light amount to be input to the imaging device 13 by changing the speed of opening/closing. The imaging device 13 is an imaging device made up of a CMOS (Complementary Metal Oxide Semiconductor), amplifies faint current generated by photoelectric conversion from the light to be input via the shutter 12, and outputs this as a voltage signal. The CDS unit 14 subjects the voltage signal to be input from the imaging device 13 to correlated double sampling processing to reduce noise therefrom, and outputs this to the A/D converting unit 15. The A/D converting unit 15 converts the voltage signal to be input from the CDS unit 14 from the analog signal to a digital signal, and outputs this to the noise data obtaining unit 16 and the noise correcting unit 18.

The noise data obtaining unit 16 registers the information of random noise in the noise database 17. More specifically, the noise data obtaining unit 16 detects random noise from an image equivalent to the time of dark (image at the time of dark, or in a pseudo-dark-time state), registers the amplitude and time constant of the noise in a manner correlated with the address of a detected pixel. The noise correcting unit 18 monitors, of pixels making up an image imaged in a common state, the pixel or column alone of an address registered in the noise database 17, and detects random noise. Subsequently, in the event of having detected random noise, the noise correcting unit 18 corrects the pixel value by processing based on the amplitude and time constant of the noise registered in the noise database 17, or other processing, and outputs this to the display unit 2 for display.

Next, the detailed configuration of the imaging device 13 will be described.

The imaging device 13 includes multiple photosensors 31-1 through 31-$n$, transfer gates 32-1 through 32-$n$, amplification transistors 33-1 through 33-$n$, and column selecting switches 34-1 through 34-$n$. Further, the imaging device 13 includes a load MOS current source 41, a comparator 42, and a counter 43. Note that, hereafter, in the event that each of the photosensors 31-1 through 31-$n$ do not have to be classified in particular, these will simply be referred to as "photosensors 31", and other configurations will also be referred to in the same way.

The photosensors 31-1 through 31-$n$ represent one column worth of photosensors 31 made up of n photosensors 31, and reality, are configured of many more columns worth of photosensors 31. However, in FIG. 1, only one column worth of configuration is illustrated. That is to say, with the photosensors 31, signals are transferred in column units. Subsequently, the load MOS current source 41, comparator 42, and counter 43 are provided to each column. Accordingly, the load MOS current source 41, comparator 42, and counter 43 are also provided according to the number of columns.

The photosensors 31 subjects light to be input from the shutter 12 to photoelectric conversion to generate faint current. With the photosensors 31, cooling units 31$a$-1 through 31$a$-$n$ are provided respectively, and cool the photosensors 31 at the time of low temperature imaging. Note that, in FIG. 1, the cooling units 31$a$ are configured so as to be provided to the photosensors 31 respectively, but in reality, the cooling units 31$a$ cool the photosensors 31 as a whole. Also, the cooling units 31$a$ are only used at the time of low temperature imaging before shipping, and accordingly, in reality, are used only for tests at a factory or the like, and are not commonly provided. However, the present configuration includes the cooling units 31$a$ on the photosensors 31 for convenience of description.

The transfer gates 32 are normally used in an on state only at the time of transfer, transfer faint current generated by the photosensors 31 to the amplification transistors 33, and are fixedly controlled in an off state by the noise data obtaining unit 16 only at the time of obtaining an image equivalent to the time of dark. With the amplification transistors 33, the gain is controlled by the gain adjustment units 33a-1 through 33a-n, and amplify the faint current transferred from the transfer gates 32 to generate output voltage. The column selecting switches 34 are normally used in an on state only at the time of column transfer, output the voltage generated by the amplification transistors 33 to the comparator 42, and are fixedly controlled in an off state by the noise data obtaining unit 16 only at the time of obtaining an image equivalent to the time of dark.

The load MOS current source 41 serves as a constant current source for holding the current value of each column constant. The comparator 42 compares ramp waves and the output voltage of each pixel to output the comparison result to the counter 43. The counter 43 counts a signal based on the comparison result to be supplied from the comparator 42, and outputs the counted count value as an analog pixel value.

Next, the detailed configuration of the noise data obtaining unit 16 will be described.

The noise data obtaining unit 16 includes an image obtaining unit 61, an image storage unit 62, a time series pixel value information generating unit 63, an image obtaining condition selecting unit 64, an pixel-units processing unit 65, and a column-units processing unit 66. The image obtaining unit 61 obtains the image signal made up of a digital signal to be supplied from the A/D converting unit 15, and stores this in the image storage unit 62. The time series pixel value information generating unit 63 generates information in which pixel values are plotted in accordance with time series in pixel units.

The image obtaining condition selecting unit 64 includes a transfer gate control unit 71, a column selecting switch control unit 72, a low temperature control unit 73, and a gain control unit 74, and selects a condition for imaging an image equivalent to the time of dark to be imaged at the time of registering the information of random noise in the noise database 17 beforehand. The transfer gate control unit 71 shuts off transfer of the signals from the photosensors 31 by turning off the transfer gate 32 of the imaging device 13, whereby an image equivalent to the time of dark can be imaged, and random noise alone to be generated at the amplification transistors 33 and thereafter is allowed to be transferred to the subsequent stage. The column selecting switch control unit 72 shuts off transfer of the signals from the amplification transistors 33 by turning off the column selecting switch 34 of the imaging device 13, whereby an image equivalent to the time of dark can be imaged, and random noise alone to be generated at the comparator 42 and thereafter is allowed to be transferred to the subsequent stage. The low temperature control unit 73 sets the shutter 12 to a closed state, controls the cooling units 31a for cooling the photosensors 31 to be in an on state, whereby an image at the time of dark including random noise of the photosensors 31 themselves in a state of suppressing photosensor temperature properties can be imaged. The gain control unit 74 controls the shutter 12 to be in a closed state, controls the gain adjustment units 33a for adjusting the gains of the amplification transistors 33, whereby an image at the time of dark including random noise to be generated by multiple different gains can be imaged.

The pixel-units processing unit 65 includes a pixel-units data processing unit 81, a pixel-units statistical processing unit 82, a pixel-units statistic generating unit 83, and a pixel value random-noise detecting unit 84, detects random noise in pixel units, and registers this in the noise database 17. The pixel-units data processing unit 81 obtains standard deviations based on the frequency of pixel values in pixel units. The pixel-units statistical processing unit 82 generates a histogram of standard deviations for each pixel value in pixel units. The pixel-units statistic generating unit 83 generates a cumulative histogram of standard deviations as to pixel values in pixel units. The pixel value random-noise detecting unit 84 detects random noise in pixel units based on the histogram of standard deviations, and the cumulative histogram of standard deviations. Subsequently, the pixel value random-noise detecting unit 84 registers, regarding a pixel where random noise has been detected, the information of the random noise in the noise database 17.

More specifically, the pixel value random-noise detecting unit 84 includes an address detecting unit 91, an amplitude detecting unit 92, and a time constant detecting unit 93. The address detecting unit 91 detects an address corresponding to a pixel position where random noise occurs. The amplitude detecting unit 92 detects the amplitude of the pixel value in time series of a pixel where random noise occurs. The time constant detecting unit 93 detects the time constant of the pixel value in time series of a pixel where random noise occurs. Subsequently, the pixel value random-noise detecting unit 84 registers the information of the detected amplitude and time constant in the noise database 17 in a manner correlated with the address of a pixel where random noise occurs.

The column-units processing unit 66 includes a column-units data processing unit 101, a column-units statistical processing unit 102, a column-units statistic generating unit 103, and a column random noise detecting unit 104. The column-units processing unit 66 detects random noise of a pixel in column units (column units in the vertical direction), and registers this in the noise database 17. The column-units data processing unit 101 obtains standard deviations based on the frequency of the pixel value of a pixel in column units. The column-units statistical processing unit 102 generates a histogram of standard deviations for each pixel value of pixels in column units. The column-units statistic generating unit 103 generates a cumulative histogram of standard deviations as to the pixel value of a pixel in column units. The column random noise detecting unit 104 detects random noise in column units based on the histogram of standard deviations in column units, and the cumulative frequency histogram of standard deviations. Subsequently, the column random noise detecting unit 104 registers, regarding a column including a pixel where random noise has been detected, the information of the random noise in the noise database 17.

More specifically, the column random noise detecting unit 104 includes an address detecting unit 111, an amplitude detecting unit 112, and a time constant detecting unit 113. The address detecting unit 111 detects an address corresponding to a column position where random noise occurs. The amplitude detecting unit 112 detects the amplitude of the pixel value in time series of a pixel in a column where random noise occurs. The time constant detecting unit 113 detects the time constant of the pixel value in time series of a pixel in a column where random noise occurs. Subsequently, the column random noise detecting unit 104 registers the information of the amplitude and time constant in the noise database 17 in a manner correlated with the address of the column where the random noise occurs.

Next, the detailed configuration of the noise correcting unit 18 will be described.

The noise correcting unit 18 is configured of an image obtaining unit 151, an image storage unit 152, a pixel-units processing unit 153, and a column-units processing unit 154, corrects random noise at the image to be supplied from the A/D converting unit 15, and displays this on the display unit 2.

The image obtaining unit 151 obtains an image signal made up of a digital signal to be supplied from the A/D converting unit 15, and stores this in the image storage unit 152.

The pixel-units processing unit 153 monitors a pixel where the random noise registered in the noise database 17 has been detected, and in the event that the random noise has occurred, uses the information of the random noise in pixel units registered in the noise database 17 as appropriate to correct the pixel value.

The pixel-units processing unit 153 includes an adjacent pixel comparison noise detecting unit 171, an area pixel comparison noise detecting unit 172, a pixel pattern comparison noise detecting unit 173, an inter-frame comparison noise detecting unit 174, a time constant comparison noise detecting unit 175, and an amplitude comparison noise detecting unit 176. Further, the pixel-units processing unit 153 includes a pixel noise amplitude addition/subtraction correcting unit 177, a pixel replacement correcting unit 178, a pixel addition/subtraction correcting unit 179, a pixel space averaging correcting unit 180, a pixel time averaging correcting unit 181, and a pixel clip correcting unit 182.

In the event that difference between the pixel values of a pixel where the random noise registered in the noise database 17 has been detected, and an adjacent peripheral pixel is greater than a predetermined threshold, the adjacent pixel comparison noise detecting unit 171 detects the random noise. In the event that difference between the pixel values of a pixel where the random noise registered in the noise database 17 has been detected, and a pixel within a predetermined area to be set so as to correspond to the pixel thereof is greater than a predetermined threshold, the area pixel comparison noise detecting unit 172 detects the random noise. The pixel pattern comparison noise detecting unit 173 detects random noise depending on whether or not a difference pattern between the pixel values of a pixel where the random noise registered in the noise database 17, and a pixel sharing the amplification transistors 33 therewith is greater than a predetermined threshold.

At the time of continuous shootings, a moving image, or the like, the inter-frame comparison noise detecting unit 174 compares difference between the pixel values of a pixel where the random noise registered in the noise database 17 has been detected, and a pixel of the last frame thereof, and detects the random noise depending on whether or not the difference is greater than a predetermined threshold. Note that, with this example, the last frame is employed for comparison, but a frame of several frames ago, or the previous or the subsequent frame may be employed for comparison. Further, fields may be employed instead of frames. With a pixel where the random noise registered in the noise database 17 has been detected, in the event that the random noise has been detected according to the above detection result, the time constant comparison noise detecting unit 175 detects the noise depending on whether or not the random noise thereof matches the time constant registered in the noise database 17. With a pixel where the random noise registered in the noise database 17 has been detected, in the event that the random noise has been detected according to the above detection result, the amplitude comparison noise detecting unit 176 detects the noise depending on whether or not the random noise thereof matches the amplitude registered in the noise database 17.

The pixel noise amplitude addition/subtraction correcting unit 177 adds or subtracts the amplitude of noise registered in the noise database 17 as to the pixel value of a pixel where noise has been detected, thereby correcting the pixel value.

The pixel replacement correcting unit 178 replaces the pixel value of a pixel where noise has detected with the pixel value of one peripheral pixel, or a mean value or a median value of peripheral pixels, thereby correcting the pixel value. The pixel addition/subtraction correcting unit 179 adds or subtracts the pixel value of one peripheral pixel, or a mean value or a median value of peripheral pixels as to the pixel value of a pixel where noise has been detected, thereby correcting the pixel value. The pixel space averaging correcting unit 180 sets a mean value including peripheral pixels to the pixel value of a pixel where noise has been detected, thereby correcting the pixel value. The pixel time averaging correcting unit 181 sets a mean value including the last several frames worth of pixels to the pixel value of a pixel where noise has been detected, thereby correcting the pixel value. The pixel clip correcting unit 182 clips a pixel value obtained from peripheral pixels as to the pixel value of a pixel where noise has been detected, thereby correcting the pixel value.

The column-units processing unit 154 monitors a column where the random noise registered in the noise database 17 has been detected, and in the event that the random noise has occurred, uses the information of the random noise in column units registered in the noise database 17 as appropriate to perform correction.

The column-units processing unit 154 includes an adjacent column comparison noise detecting unit 201, an area column comparison noise detecting unit 202, an inter-frame comparison noise detecting unit 203, a time constant comparison noise detecting unit 204, and an amplitude comparison noise detecting unit 205. Further, the column-units processing unit 154 includes a column noise amplitude addition/subtraction correcting unit 206, a column replacement correcting unit 207, a column addition/subtraction correcting unit 208, a column space averaging correcting unit 209, a column time averaging correcting unit 210, and a column clip correcting unit 211.

In the event that difference between the pixel values of a pixel in a column where the random noise registered in the noise database 17 has been detected, and a pixel in an adjacent peripheral column is greater than a predetermined threshold, the adjacent column comparison noise detecting unit 201 detects the random noise. In the event that difference between the pixel values of a pixel where the random noise registered in the noise database 17 has been detected, and a pixel in a column within a predetermined area to be set so as to correspond to the column thereof is greater than a predetermined threshold, the area column comparison noise detecting unit 202 detects the random noise.

The inter-frame comparison noise detecting unit 203 compares, at the time of continuous shootings or a moving image, difference between the pixel values in a column where the random noise registered in the noise database 17 has been detected, and in a column of the last frame thereof, and detects the random noise depending on whether or not the difference is greater than a predetermined threshold. In the event that random noise has been detected according to the above detection result in a column where the random noise registered in the noise database 17 has been detected, the time constant comparison noise detecting unit 204 detects the random noise depending on whether the random noise matches the time constant registered in the noise database 17. In the event that random noise has been detected according to the above detection result in a column where the random noise registered in the noise database 17 has been detected, the amplitude comparison noise detecting unit 205 detects the random noise depending on whether the random noise matches the amplitude registered in the noise database 17.

The column noise amplitude addition/subtraction correcting unit 206 adds or subtracts the amplitude of the noise registered in the noise database 17 as to the pixel value of a pixel in a column where noise has been detected, thereby correcting the pixel value in column units. The column replacement correcting unit 207 replaces the pixel value of a pixel in a column where noise has detected with the pixel value of a pixel in one peripheral column, or a mean value or a median value in peripheral columns, thereby correcting the pixel value. The column addition/subtraction correcting unit 208 adds or subtracts the pixel value of a pixel in one peripheral column, or a mean value or a median value in peripheral columns as to the pixel value of a pixel in a column where noise has been detected, thereby correcting the pixel value. The column space averaging correcting unit 209 sets a mean value including pixels in peripheral columns to the pixel value of a pixel in a column where noise has been detected, thereby correcting the pixel value. The column time averaging correcting unit 210 sets a mean value including pixels in the last several frames worth of columns to the pixel value of a pixel in a column where noise has been detected, thereby correcting the pixel value. The column clip correcting unit 211 clips a pixel value obtained from pixels in peripheral columns as to the pixel value of a pixel in a column where noise has been detected, thereby correcting the pixel value.

Noise Database Registration Processing

Next, processing will be described wherein an image equivalent to the time of dark, or an image at the time of dark is imaged, random noise is detected from the imaged image, and is registered in the noise database 17, with reference to the flowchart in FIG. 2.

In step S11, the noise data obtaining unit 16 executes image obtaining processing, images an image equivalent to the time of dark or an image at the time of dark by changing conditions, and obtains the imaged image.

Image Obtaining Processing

Figure 3:
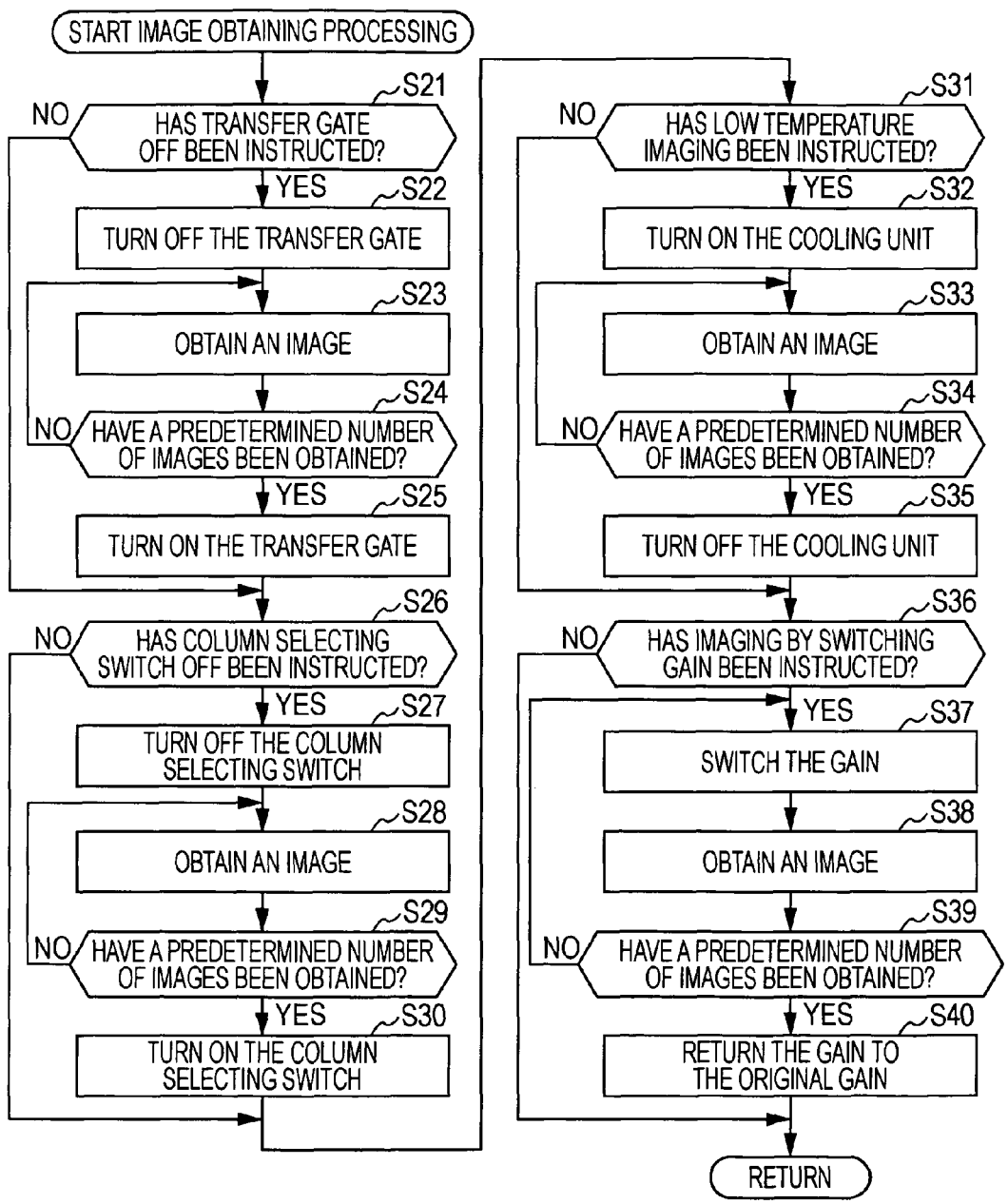
FIG. 3 is a flowchart for describing image obtaining processing.

Here, the image obtaining processing will be described with reference to the flowchart in FIG. 3.

In step S21, the image obtaining condition selecting unit 64 determines whether or not the transfer gates 32 have been set to off so as to image an image equivalent to the time of dark. For example, in the event that the transfer gates 32 have been turned off by unshown setting operations so as to image an image equivalent to the time of dark, the processing proceeds to step S22.

In step S22, the image obtaining condition selecting unit 64 controls the transfer gate control unit 71 to turn off the transfer gates 32. According to this processing, the transfer gates 32 of the imaging device 13 are controlled to be off. As a result thereof, only the image signal equivalent to the time of dark from which the signal from each of the photosensors 31 of the imaging device 13 is cut, including noise of the amplification transistors 33 and thereafter is supplied from the A/D converting unit 15 to the noise data obtaining unit 16.

In step S23, the image obtaining unit 61 stores the image signal equivalent to the time of dark from which the signal from each of the photosensors 31 of the imaging device 13 is cut, including noise of the amplification transistors 33 and thereafter to the image storage unit 62.

In step S24, the image obtaining unit 61 determines whether or not a predetermined number of images have been obtained, and in the event that a predetermined number of images have not been obtained, the processing returns to step S23. That is to say, the processing in steps S23 through S24 is repeated until a predetermined number of images are obtained. Subsequently, in the event that a predetermined number of images have been obtained in step S24, the processing proceeds to step S25.

In step S25, the transfer gate control unit 71 controls the transfer gates 32 to be in an on state, i.e., in a normal control state other than an fixed off state, and ends the obtaining processing of an image equivalent to the time of dark in a state in which the transfer gates 32 are turned off.

That is to say, according to the processing in steps S22 through S25, the transfer gates 32 are turned off, and an image equivalent to the time of dark in a state in which the signals from the photosensors 31 are cut is accumulated in the image storage unit 62.

On the other hand, in the event that the transfer gates 32 are not set to be off in step S21, the processing in steps S22 through S25 is skipped, and the processing proceeds to step S26.

In step S26, the image obtaining condition selecting unit 64 determines whether or not the column selecting switch 34 has been set to be off so as to image an image equivalent to the time of dark. For example, in the event that the column selecting switch 34 has been set to be off by unshown setting operations so as to image an image equivalent to the time of dark, the processing proceeds to step S27.

In step S27, the image obtaining condition selecting unit 64 controls the column selecting switch control unit 72 to turn off the column selecting switches 34. According to this processing, the column selecting switches 34 of the imaging device 13 are controlled to be off. As a result thereof, only the image signal equivalent to the time of dark from which the signals from the amplification transistors 33 are cut, including noise of the comparator 42 and thereafter is supplied from the A/D converting unit 15 to the noise data obtaining unit 16.

In step S28, the image obtaining unit 61 stores the image signal equivalent to the time of dark from which the signal from each of the amplification transistors 33 of the imaging device 13 is cut, including noise of the comparator 42 and thereafter to the image storage unit 62.

In step S29, the image obtaining unit 61 determines whether or not a predetermined number of images have been obtained, and in the event that a predetermined number of images have not been obtained, the processing returns to step S28. That is to say, the processing in steps S28 through S29 is repeated until a predetermined number of images are obtained. Subsequently, in the event that a predetermined number of images have been obtained in step S29, the processing proceeds to step S30.

In step S30, the column selecting control unit 72 controls the column selecting switches 34 to be in an on state, i.e., in a normal control state other than an fixed off state, and ends the obtaining processing of an image equivalent to the time of dark in a state in which the column selecting switches 34 are turned off.

That is to say, according to the processing in steps S27 through S30, the column selecting switches 34 are turned off, and an image equivalent to the time of dark in a state in which the signals from the amplification transistors 33 are cut is accumulated in the image storage unit 62.

On the other hand, in the event that the column selecting switches 34 are not set to be off in step S26, the processing in steps S27 through S30 is skipped, and the processing proceeds to step S31.

In step S31, the image obtaining condition selecting unit 64 determines whether or not the shutter 12 has been set to be closed, and the cooling units 31*a* have been set to be on so as to image an image at the time of dark. For example, in the event that the shutter 12 has been set to be closed and the cooling units 31*a* have been set to be off by unshown setting operations so as to image an image at the time of dark, the processing proceeds to step S32.

In step S32, the image obtaining condition selecting unit 64 controls the low temperature control unit 73 to close the shutter 12 and turn on the cooling units 31*a*. According to this processing, the shutter 12 is closed, and the cooling units 31*a* of the photosensors 31 of the imaging device 13 are turned on. As a result thereof, according to the photosensors 31 being cooled, an image from which heat noise accompanied with temperature rise is reduced, i.e., only the image signal imaged in low temperature at the time of dark is supplied from the A/D converting unit 15 to the noise obtaining unit 16.

In step S33, the image obtaining unit 61 stores the image signal imaged in low temperature at the time of dark in the image storage unit 62.

In step S34, the image obtaining unit 61 determines whether or not a predetermined number of images have been obtained, and in the event that a predetermined number of images have not been obtained, the processing returns to step S33. That is to say, the processing in steps S33 through S34 is repeated until a predetermined number of images are obtained. Subsequently, in the event that a predetermined number of images have been obtained in step S34, the processing proceeds to step S35.

In step S35, the low temperature control unit 73 sets the shutter 12 to an openable state, and also sets the cooling units 31*a* to an off state, controls these in a normal control state, and ends the processing for obtaining an image at the time of dark by low temperature imaging.

That is to say, according to the processing in steps S32 through S35, the shutter 12 is in a closed state, and the cooling units 31*a* are turned on, and the image at the time of dark by low temperature imaging is accumulated in the image storage unit 62.

On the other hand, in the event that the shutter 12 is not set to be closed, and the cooling units 31*a* are not set to be on in step S31, the processing in steps S32 through S35 is skipped, and the processing proceeds to step S36.

In step S36, the image obtaining condition selecting unit 64 determines whether or not the shutter 12 has been set to be closed, the gain adjustment units 33*a* of the amplification transistors 33 have been controlled so as to image an image at the time of dark of multiple gains. For example, in the event that the shutter 12 has been closed, and the gain adjustment units 33*a* of the amplification transistors 33 have been controlled so as to image an image at the time of dark of multiple gains by unshown setting operations, the processing proceeds to step S37.

In step S37, the image obtaining condition selecting unit 64 controls the gain control unit 74 to close the shutter 12, and controls the gain adjustment units 33*a* of the amplification transistors 33 to switch the gains. According to this processing, the shutter 12 is closed, the gain adjustment units 33*a* of the amplification transistors 33 are controlled, and the gains are switched. As a result thereof, only the image signal imaged at the time of dark is supplied form the A/D converting unit 15 to the noise data obtaining unit 16 according to various gains.

In step S38, the image obtaining unit 61 stores the image signal imaged in a state in which the gains at the time of dark are adjusted to the image storage unit 62.

In step S39, the image obtaining unit 61 determines whether or not a predetermined number of images have been obtained, and in the event that a predetermined number of images have not been obtained, the processing returns to step S37. That is to say, the processing in steps S37 through S39 is repeated until a predetermined number of images are obtained. Subsequently, in the event that a predetermined number of images have been obtained in step S39, the processing proceeds to step S40.

In step S40, the gain control unit 74 sets the shutter 12 to an openable state, and also sets the gains to the original states by the gain adjustment units 33*a*, controls these in a normal control state, and ends the processing for obtaining an image at the time of dark by imaging with multiple gains.

That is to say, according to the processing in steps S37 through S39, the shutter 12 is closed, and the image at the time of dark is accumulated in the image storage unit 62 in a state variously adjusted by the gain adjustment units 33*a*.

On the other hand, in the event that the shutter 12 is not set to be closed, and the gains are not set to be various gains by the gain adjustment units 33*a* in step S36, the processing in steps S37 through S40 is skipped, and the processing ends.

According to the above processing, one of the image equivalent to the time of dark in state in which the transfer gates 32 are off, the image equivalent to the time of dark in a state in which the column selecting switches 34 are off, the image at the time of dark when the shutter 12 is set to a closed state in a state in which the photosensors 31 are cooled, and the image at the time of dark in a state in which the gains of the amplification transistors 33 are multiply adjusted by the gain adjustment units 33*a*, or all of these may be stored in the image storage unit 62. Note that, with the flowchart in FIG. 3, though there may be a situation wherein neither of the images equivalent to the time of dark nor the images at the time of dark are imaged, let us say that at least one type of the images equivalent to the time of dark, or the image at the time of dark is imaged.

Figure 2:
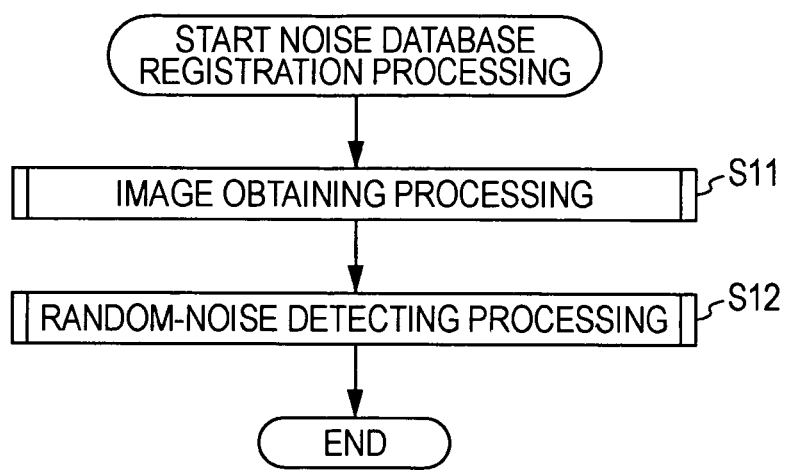
FIG. 2 is a flowchart for describing noise database registration processing.

Now, description will return to the description of the flowchart in FIG. 2.

Upon the image obtaining processing ending in step S11, in step S12 the noise data obtaining unit 16 executes random noise obtaining processing to obtain random noise from the obtained image equivalent to the time of dark or the obtained image at the time of dark, and registers this in the noise database 17.

Random Noise Obtaining Processing

Figure 4:
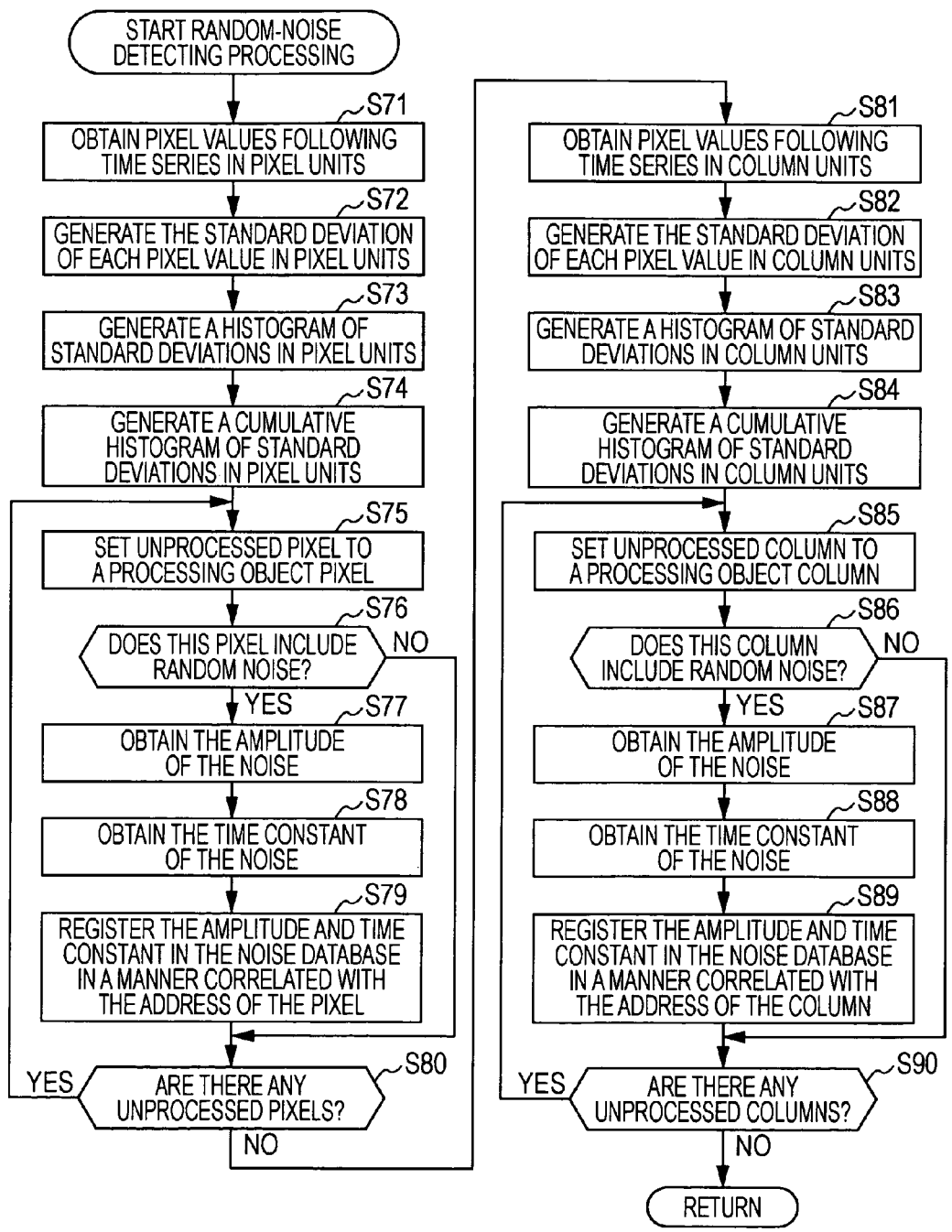
FIG. 4 is a diagram for describing random-noise detecting processing.

Now, the random noise obtaining processing will be described with reference to the flowchart in FIG. 4.

In step S71, the time series pixel value information generating unit 63 obtains the pixel value in time series regarding each pixel, and plots this.

In step S72, the pixel-units processing unit 65 controls the pixel-units data processing unit 81 to obtain the standard deviation according to a pixel value in pixel units. Note that standard deviation mentioned here is the square root of a value obtained by dividing the sum of squares of difference between the mean value of the pixel values of pixels in all the time series and the pixel value of each pixel by the number of pixels.

In step S73, the pixel-units statistical processing unit 82 generates a histogram according to standard deviations obtained in pixel units.

In step S74, the pixel-units statistic generating unit 83 generates a cumulative histogram according to the obtained histogram in pixel units.

In step S75, the pixel value random-noise detecting unit 84 sets, of pixels serving as a processing object of the imaging device 13, an unprocessed pixel to a processing object pixel.

Figure 5:
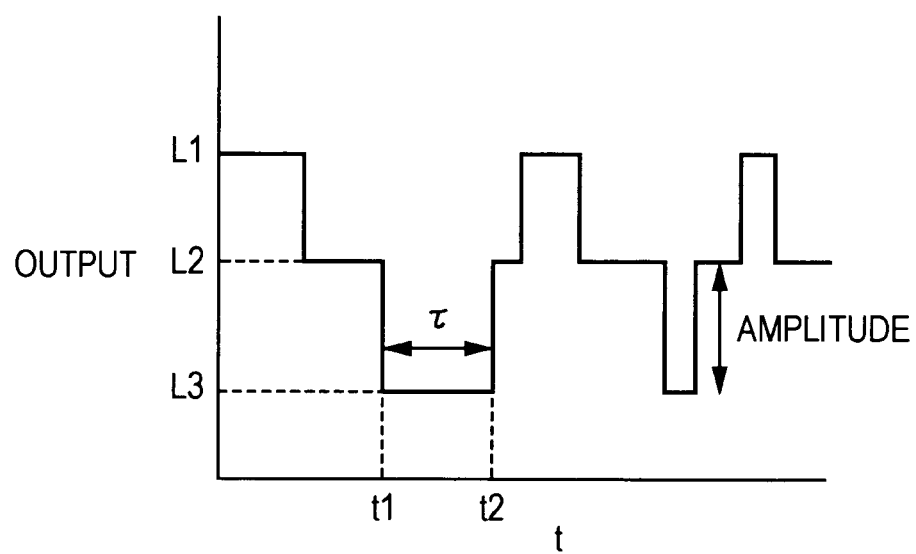
FIG. 5 is a diagram for describing amplitude and a time constant.

In step S76, the pixel value random-noise detecting unit 84 determines, based on the histogram of standard deviations or the cumulative histogram, whether or not the processing object pixel is a pixel including random noise depending on whether or not the processing object pixel has a pixel value greater than a predetermined threshold. More specifically, with the noise of the image at the time of dark, a small pixel value is often due to thermal noise or 1/f noise included in a normal distribution, and random noise is apt to be exponentially changed according to the size of a pixel value. Therefore, the pixel value random-noise detecting unit 84 considers that random noise has occurred regarding the pixel with a pixel value which exponentially changes (deviates from the normal distribution). Examples of pixels deviating from the normal distribution to be exponentially changed include a pixel other than a predetermined number around the peak of the normal distribution, a pixel of which the cumulative relative frequency is very small (e.g., a pixel of 0.1 or less), and a pixel that takes a pixel value serving as three or more discrete values. Here, a pixel taking three discrete values mentioned here is, for example, a waveform such as illustrated in FIG. 5. That is to say, the image to be processed is an image equivalent to the time of dark, or an image at the time of dark, the pixel value should ideally be a constant value, but taking three or more discrete values can be conceived as influence of random noise. FIG. 5 illustrates a waveform where a pixel value is plotted in time series, which is configured of only three values of pixel values L1, L2, and L3.

In the event that determination is made in step S76 that the processing object pixel is a pixel including random noise, the processing proceeds to step S77. In step S77, the amplitude detecting unit 92 detects the amplitude of the random noise according to the results where a pixel value is plotted in time series. That is to say, with the amplitude of the random noise mentioned here, such as illustrated in FIG. 5 for example, the waveform takes three or more discrete values, and accordingly, a value serving as difference between the discrete values becomes the amplitude of the noise. In FIG. 5, the difference between the pixel values L2 and L3 that is greater than the difference between the pixel values L1 and L2 is taken as the amplitude, but smaller one may be taken as the amplitude, or a mean value thereof my be taken as the amplitude.

In step S78, the time constant detecting unit 93 detects the time constant τ of the random noise from the results where a pixel value is plotted in time series. That is to say, the time constant τ of the random noise means, for example, a period τ of point-in-time t1 through point-in-time t2 while a state in which the pixel value L3 in FIG. 5 is kept continues. Note that with regard to this time constant as well, the length of time taking the same pixel value varies, and accordingly, the maximum value, minimum value, mean value, or median value may be employed.

In step S79, the address detecting unit 91 obtains the address of a pixel serving as the processing object, and also accesses the noise database 17 to register the amplitude and time constant in a manner correlated with the address as noise data.

On the other hand, in the event that determination is made in step S76 that the processing object pixel includes no random noise, the processing in steps S77 through S79 is skipped, and the processing proceeds to step S80.

In step S80, the pixel value random-noise detecting unit 84 determines whether or not there is an unprocessed pixel of the pixels serving as a processing object of the imaging device 13, and in the event that there is an unprocessed pixel, the processing returns to step S75. That is to say, the processing in steps S75 through S80 is repeated until there is no unprocessed pixel. Subsequently, in the event that determination is made in step S80 that there is no unprocessed pixel, the processing proceeds to step S81.

As described above, according to the processing in steps S71 through S80, existence of random noise is determined in pixel units, and in the event that random noise is included, the amplitude and time constant of the random noise are registered in the noise database 17 in a manner correlated with the address for determining the pixel.

In step S81, the time series pixel value information generating unit 63 obtains and plots the mean value of pixel values in time series regarding each column. Note that the mean value of the pixel values of pixels included in a column is employed here, but this is not restricted to the mean value, as long as the tendency of the pixel values of pixels in the column can be understood, and accordingly, for example, the maximum value, minimum value, or median value or the like may be employed.

In step S82, the column-units processing unit 66 controls the column-units data processing unit 101 to obtain the standard deviation according to a pixel value in column units. Note that with the mean value of pixels making up a column as the pixel value of the column as a unit, the standard deviation mentioned here is the square root of a value obtained by dividing the sum of squares of difference between the mean value of the pixel values in the column units in all the time series and the pixel value of each column by the number of columns.

In step S83, the column-units statistical processing unit 102 generates a histogram according to standard deviations obtained in column units.

In step S84, the column-units statistic generating unit 103 generates a cumulative histogram according to the obtained histogram in column units.

In step S85, the column random noise detecting unit 104 sets, of columns serving as a processing object of the imaging device 13, an unprocessed column to a processing object column.

In step S86, the column random noise detecting unit 104 determines, based on the histogram of standard deviations or the cumulative histogram, whether or not the processing object column is a column including random noise depending on whether or not the processing object column has a pixel value greater than a predetermined threshold, in the same way as with the processing in pixel units.

In the event that determination is made in step S86 that the processing object column is a column including random noise, the processing proceeds to step S87. In step S87, the amplitude detecting unit 112 detects the amplitude of the random noise in the column units in the same way as with the processing in pixel units according to the results where a pixel value is plotted in time series in column units.

In step S88, the time constant detecting unit 113 detects the time constant τ of the random noise in the same way as with the processing in pixel units according to the results where a pixel value is plotted in time series in column units.

In step S89, the address detecting unit 111 obtains the address of a column serving as the processing object, and also accesses the noise database 17 to register the amplitude and time constant in a manner correlated with the address in column units as noise data.

On the other hand, in the event that determination is made in step S86 that the processing object column includes no random noise, the processing in steps S87 through S89 is skipped, and the processing proceeds to step S90.

In step S90, the column random noise detecting unit 104 determines whether or not there is an unprocessed column of the columns serving as a processing object of the imaging device 13, and in the event that there is an unprocessed column, the processing returns to step S85. That is to say, the processing in steps S85 through S90 is repeated until there is no unprocessed column. Subsequently, in the event that determination is made in step S90 that there is no unprocessed column, the processing ends.

As described above, according to the processing in steps S81 through S90, existence of random noise is determined in column units, and in the event that random noise is included, the amplitude and time constant of the random noise are registered in the noise database 17 in a manner correlated with the address for determining the column.

Now, description will return to the flowchart in FIG. 2.

Upon the random-noise detecting processing in step S12 ending, the amplitude and time constant of the noise are registered in the noise database 17 in pixel units or column units where the random noise has been detected.

As a result thereof, the information of random noise to be detected in a various state of the imaging device 13 according to the image equivalent to the time of dark, or the image at the time of dark may be registered as a database.

According to the above, description has been made regarding an example wherein one of the image equivalent to the time of dark in state in which the transfer gates 32 are off, the image equivalent to the time of dark in a state in which the column selecting switches 34 are off, the image at the time of dark when the shutter 12 is set to a closed state in a state in which the photosensors 31 are cooled, and the image at the time of dark in a state in which the gains of the amplification transistors 33 are multiply adjusted by the gain adjustment units 33a, or all of these are stored in the image storage unit 62, random noise is detected in pixel units and column units regarding these images, and in the event that random noise has been detected, the amplitude and time constant are registered in the noise database 17 in a manner correlated with the address in pixel units and column units. However, the images equivalent to the time of dark, and the images at the time of dark do not have to be imaged with all of these imaging conditions, and should be imaged with at least one condition thereof. Also, registration of noise data to the noise database 17 may be performed either in pixel units or in column units.

Imaging Processing

Next, imaging processing will be described wherein an imaged image is corrected using the noise database 17 generated by the above processing, with reference to the flowchart in FIG. 6.

In step S101, according to unshown imaging operations, the shutter 12 is opened, an image is imaged by generating an image signal through the imaging device 13 based on the light input via the lens 11. Subsequently, the image signal imaged by the imaging device 13 is supplied to the noise correcting unit 18 via the CDS unit 14 and the A/D converting unit 15. The image obtaining unit 151 obtains the image to be supplied from the A/D converting unit 15, and temporarily stored this in the image storage unit 152.

In step S102, the noise correcting unit 18 uses the image information stored in the image storage unit 152 to execute noise determination processing, where occurrence of random noise is determined in increments of pixels or columns of an imaged image.

Noise Determination Processing

Figure 7B:
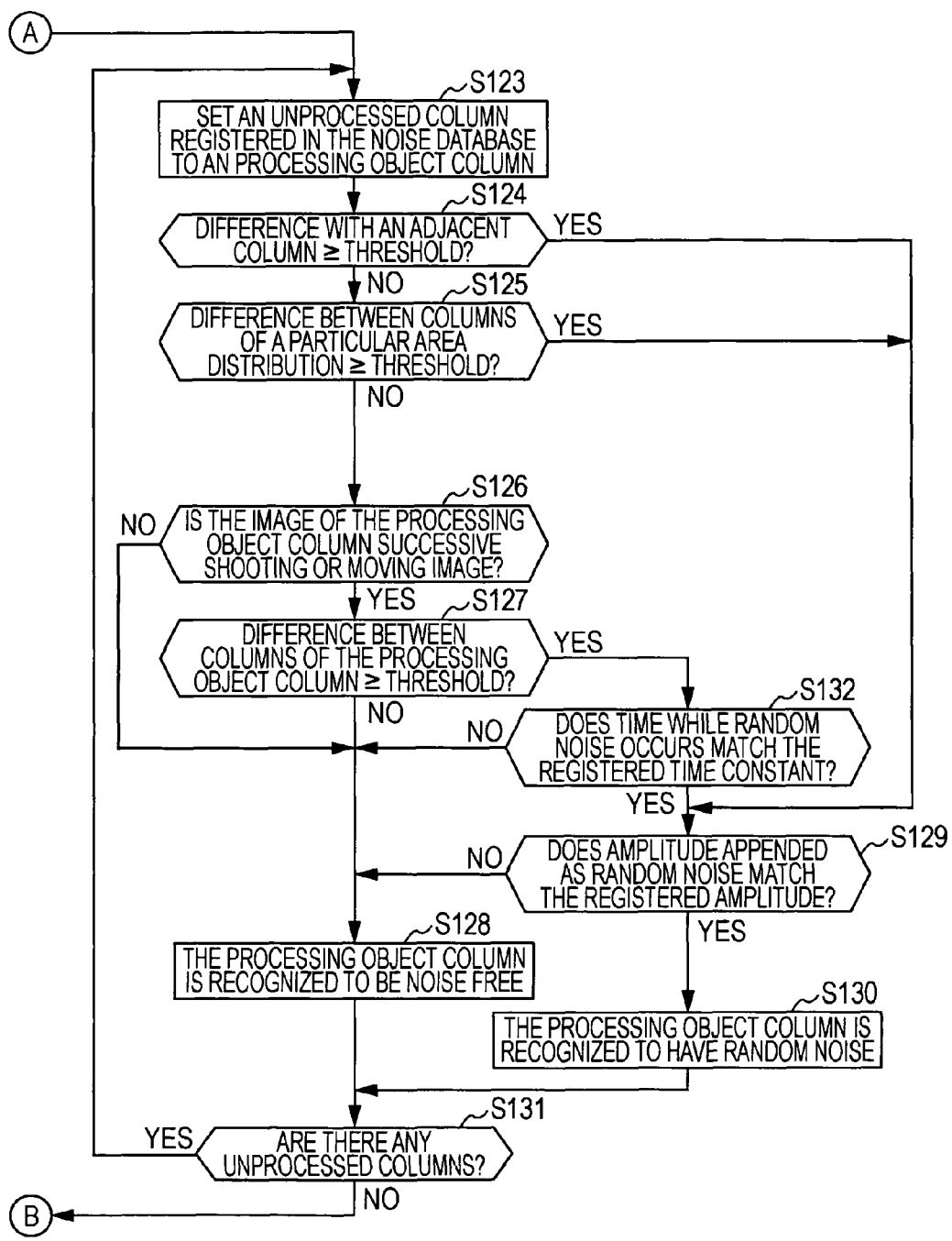
FIG. 7 is a flowchart for describing random-noise determination processing.

Now, the noise determination processing will be described with reference to FIG. 7.

In step S111, the noise correcting unit 18 determines whether noise correction is set to be performed in pixel units or in column units by unshown setting operations. For example, in the event that determination is made in step S111 that correction is set to be performed in pixel units by unshown setting operations, the processing proceeds to step S112.

In step S112, the pixel-units processing unit 153 accesses the noise database 17 to set, of pixels corresponding to an address registered as a pixel where random noise has occurred, a pixel corresponding to an unprocessed address to the processing object pixel.

In step S113, the adjacent pixel comparison noise detecting unit 171 obtains difference between the pixel value of a pixel serving as the processing object, and the pixel values of multiple adjacent pixels, and determines whether or not the mean value of the difference thereof is greater than a predetermined threshold. For example, in the event that the mean value of the difference of the pixel values as to the multiple adjacent pixels is greater than a predetermined threshold, the adjacent pixel comparison noise detecting unit 171 considers that the processing object pixel includes not only the signal value of the pixel value but also random noise, the processing proceeds to step S119.

In step S119, the amplitude comparison noise detecting unit 176 determines whether or not amplitude appended as random noise is generally matches (or is similar to) the amplitude registered in the noise database 17 from comparison with the pixel values of peripheral pixels of the pixel serving as the processing object. In the event that determination is made in step S119 that both generally match, the processing proceeds to step S120.

In step S120, the pixel-units processing unit 153 recognizes, based on the determination result of the adjacent pixel comparison noise detecting unit 171, that random noise has occurred as to the pixel serving as the processing object.

Also, in the event that determination is made in step S119 that amplitude appended as random noise does not match the amplitude registered in the noise database 17 from comparison with the pixel values of peripheral pixels of the pixel serving as the processing object, the processing proceeds to step S118.

In step S118, the pixel-units processing unit 153 recognizes that random noise has not occurred as to the processing object pixel, based on the determination result of the adjacent pixel comparison noise detecting unit 171.

On the other hand, in the event that determination is made in step S113 that the mean value of the difference of the pixel values as to the multiple adjacent pixels is not greater than a predetermined threshold, and occurrence of random noise has not been detected with the difference between the pixel values of the adjacent pixels, the processing proceeds to step S114.

In step S114, the area pixel comparison noise detecting unit 172 obtains difference between the pixel value of the processing object pixel, and the pixel value of a pixel in a peripheral area serving as a particular positional relation as to the processing object pixel, and determines whether or not the mean value of these is greater than a predetermined threshold. For example, in the event that the mean value of difference between the pixel values of the processing object pixel, and multiple pixels in an area serving as a particular positional relation is greater than a predetermined threshold, the area pixel comparison noise detecting unit 172 considers that the processing object pixel includes not only the signal value of the pixel value but also random noise, the processing proceeds to step S119.

On the other hand, in the event that determination is made in step S114 that the mean value of the difference between the pixel value of the processing object pixel, and the pixel value of a pixel in a peripheral area serving as a particular positional relation as to the processing object pixel is not greater than a predetermined threshold, the processing proceeds to step S115.

In step S115, the pixel pattern comparison noise detecting unit 173 obtains difference between multiple pixels sharing the amplification transistors 33 with the processing object pixel, and determines whether or not the difference pattern thereof matches a predetermined pattern. For example, in the event that the difference between multiple pixels sharing the amplification transistors 33 with the processing object pixel is obtained, and the difference pattern thereof matches a predetermined pattern, the processing proceeds to step S119.

On the other hand, in step S115, in the event that the difference between multiple pixels sharing the amplification transistors 33 with the processing object pixel is obtained, and determination is made that the difference pattern thereof does not match a predetermined pattern, the processing proceeds to step S116.

In step S116, the inter-frame comparison noise detecting unit 174 determines whether the image of the processing object pixel is a continuous image or a moving image. In the event that determination is made in step S116 that the image of the processing object pixel is a continuous image or a moving image, the processing proceeds to step S117. In step S117, the inter-frame comparison noise detecting unit 174 calculates difference between the pixel value of the processing object pixel, and the pixel value of a pixel at the same position in the last frame, and determines whether or not the difference is greater than a predetermined threshold. For example, in the event that determination is made in step S117 that the difference is greater than a predetermined threshold, the inter-frame comparison noise detecting unit 174 considers that random noise has occurred, and the processing proceeds to step S122.

In step S122, the time constant comparison noise detecting unit 175 determines whether or not a period over which random noise has occurred generally matches the time constant τ registered in the noise database 17 from the information of the previous and subsequent frames of the processing object pixel. In the event that determination is made in step S122 that the period over which random noise has occurred matches the time constant from the information of the previous and subsequent frames of the processing object pixel, the processing proceeds to step S119.

On the other hand, in the event that determination is made in step S117 that the difference between the pixel value of the processing object pixel, and the pixel value of a pixel at the same position in the last frame is not greater than a predetermined threshold, the processing proceeds to step S118. Also, in the event that determination is made in step S122 that the period over which random noise has occurred does not match the time constant from the information of the previous and subsequent frames of the processing object pixel, the processing proceeds to step S118.

That is to say, the processing object pixel is determined to have no random noise in the event that the difference with an adjacent pixel is small, the difference with the pixel value of a peripheral pixel in a particular area is small, the difference between pixels employing the common amplification transistors 33 is a predetermined pattern, and the amplitude does not match the amplitude registered in the noise database 17. However, in the case of a continuous image or moving image, and further in the event that the difference between frames is smaller than a predetermined threshold, and the time constant τ does not match, the processing object pixel is determined to have no random noise. Also, the processing object pixel is determined to have random noise in the event that the difference with an adjacent pixel is great, the difference with the pixel value of a peripheral pixel in a particular area is great, or the difference between pixels employing the common amplification transistors 33 is not a predetermined pattern, and also the amplitude matches the amplitude registered in the noise database 17. However, in the case of a continuous image or moving image, and further in the event that the difference between frames is greater than a predetermined threshold, and the time constant τ matches, the processing object pixel is determined to have random noise.

In step S121, the pixel-units processing unit 153 determines whether or not there is an unprocessed pixel, and in the event that there is an unprocessed pixel, the processing returns to step S112, and hereafter, the subsequent processing is repeated. Also, in the event that determination is made in step S121 that there is no unprocessed pixel, the processing ends.

On the other hand, in the event that determination is made in step S111 that the present processing is not pixel-units processing, i.e., column-units processing, the processing proceeds to step S123.

In step S123, the column-units processing unit 154 accesses the noise database 17 to set, of the columns corresponding to an address registered as a column where random noise has occurred, a column corresponding to an unprocessed address to the processing object column.

In step S124, the adjacent column comparison noise detecting unit 201 obtains difference between the pixel values of multiple pixels in the processing object column, and the pixel values of multiple pixels in an adjacent column, and determines whether or not the mean value of the difference thereof is greater than a predetermined threshold. For example, in the event that the mean value of the difference of the pixel values as to the multiple pixels in the adjacent column is greater than a predetermined threshold, the adjacent column comparison noise detecting unit 201 considers that the processing object column includes not only the signal value of the pixel value but also random noise, the processing proceeds to step S129.

In step S129, the amplitude comparison noise detecting unit 205 determines whether or not amplitude appended as random noise generally matches (or is similar to) the amplitude registered in the noise database 17 from comparison with pixels in peripheral columns of the processing object column. In the event that determination is made in step S129 that both generally match, the processing proceeds to step S130.

In step S130, the column-units processing unit 154 recognizes, based on the determination result of the adjacent column comparison noise detecting unit 201, that random noise has occurred as to the column serving as the processing object.

Also, in the event that determination is made in step S129 that amplitude appended as random noise does not match the amplitude registered in the noise database 17 from comparison with pixels in peripheral columns of the column serving as the processing object, the processing proceeds to step S128.

In step S128, the column-units processing unit 154 recognizes that random noise has not occurred as to the processing object column, based on the determination result of the adjacent column comparison noise detecting unit 201.

On the other hand, in the event that determination is made in step S124 that the mean value of the difference of the pixel values as to the multiple adjacent pixels in adjacent columns is not greater than a predetermined threshold, and occurrence of random noise has not been detected with the difference between the pixel values in the adjacent columns, the processing proceeds to step S125.

In step S125, the area column comparison noise detecting unit 202 obtains difference between the pixel values of pixels in the processing object column, and the pixel values of pixels in a column in a peripheral area serving as a particular positional relation as to the processing object column, and determines whether or not the mean value of these is greater than a predetermined threshold. For example, in the event that the mean value of difference between the pixel values in the processing object column, and multiple columns in an area serving as a particular positional relation is greater than a predetermined threshold, the area column comparison noise detecting unit 202 considers that the processing object column includes not only the signal value of the pixel value but also random noise, the processing proceeds to step S129.

On the other hand, in the event that determination is made in step S125 that the mean value of the difference between the pixel values in the processing object column, and the pixel values in a column in a peripheral area serving as a particular positional relation as to the processing object column is not greater than a predetermined threshold, the processing proceeds to step S126.

In step S126, the inter-frame comparison noise detecting unit 203 determines whether the image of the processing object column is a continuous image or a moving image. In the event that determination is made in step S126 that the image of the processing object column is a continuous image or a moving image, the processing proceeds to step S127.

In step S127, the inter-frame comparison noise detecting unit 203 calculates the mean value of difference between the pixel values in the processing object column, and the pixel values in the column of the same positions in the last frame, and determines whether or not the mean value is greater than a predetermined threshold. For example, in the event that determination is made in step S127 that the mean value is greater than a predetermined threshold, the inter-frame comparison noise detecting unit 203 considers that random noise has occurred, and the processing proceeds to step S132.

In step S132, the time constant comparison noise detecting unit 204 determines whether or not a period over which random noise has occurred generally matches the time constant τ registered in the noise database 17 from the information of the previous and subsequent frames of the processing object column. In the event that determination is made in step S132 that the period over which random noise has occurred generally matches the time constant from the information of the previous and subsequent frames of the processing object pixel, the processing proceeds to step S129.

Further, in the event that determination is made in step S132 that the period over which random noise has occurred does not match the time constant registered in the noise database 17, from the information of the previous and subsequent frames of the processing object column, the processing proceeds to step S128.

On the other hand, in the event that determination is made in step S127 that the mean value of difference between the pixel values in the processing object column, and the pixel values in the column of the same positions in the last frame is not greater than a predetermined threshold, the processing proceeds to step S128.

That is to say, the processing object column is determined to have no random noise in the event that the difference with an adjacent column is small, the difference with the pixel values in a peripheral column in a particular area is small, and the amplitude does not match the amplitude registered in the noise database 17. However, in the case of a continuous image or moving image, and further, when difference between frames is smaller than a predetermined threshold, and the time constant does not match the registered time constant, the processing object column is determined to have no random noise. Also, the processing object column is determined to have random noise in the event that difference between pixels with an adjacent column is great, or difference between pixel values with a peripheral column in a particular area is great, and also the amplitude matches the registered amplitude. However, the processing object column is determined to have random noise in the case of a continuous image or moving image, and further, when difference between pixels between frames or columns is greater than a predetermined threshold, and the time constant matches the registered time constant.

In step S131, the column-units processing unit 154 determines whether or not there is an unprocessed column, and in the event that there is an unprocessed column, the processing returns to step S123, and the subsequent processing is repeated. Also, in the event that determination is made in step S131 that there is no unprocessed column, the processing ends.

According to the above processing, the pixel units or column units corresponding to registered addresses are monitored based on the noise information of the noise database 17, and determination is made whether or not random noise is included.

Figure 6:
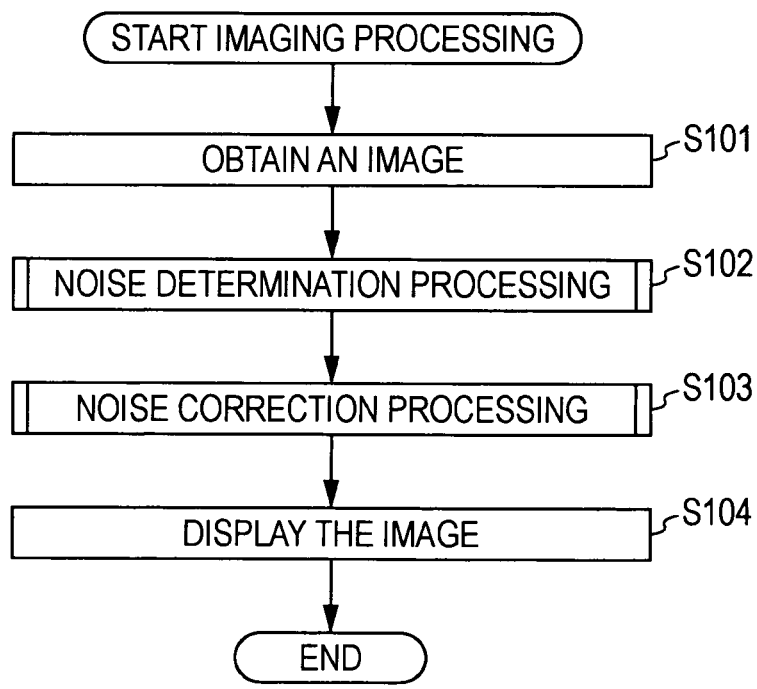
FIG. 6 is a flowchart for describing imaging processing.

Now, description will return to the flowchart in FIG. 6.

In step S102, noise determination processing is executed in pixel units or in column units, and the processing proceeds to step S103.

In step S103, the noise correcting unit 18 executes noise correction processing to correct a pixel where random noise has been detected in pixel units or column units of addresses registered in the noise database 17.

Noise Correction Processing

Figure 8B:
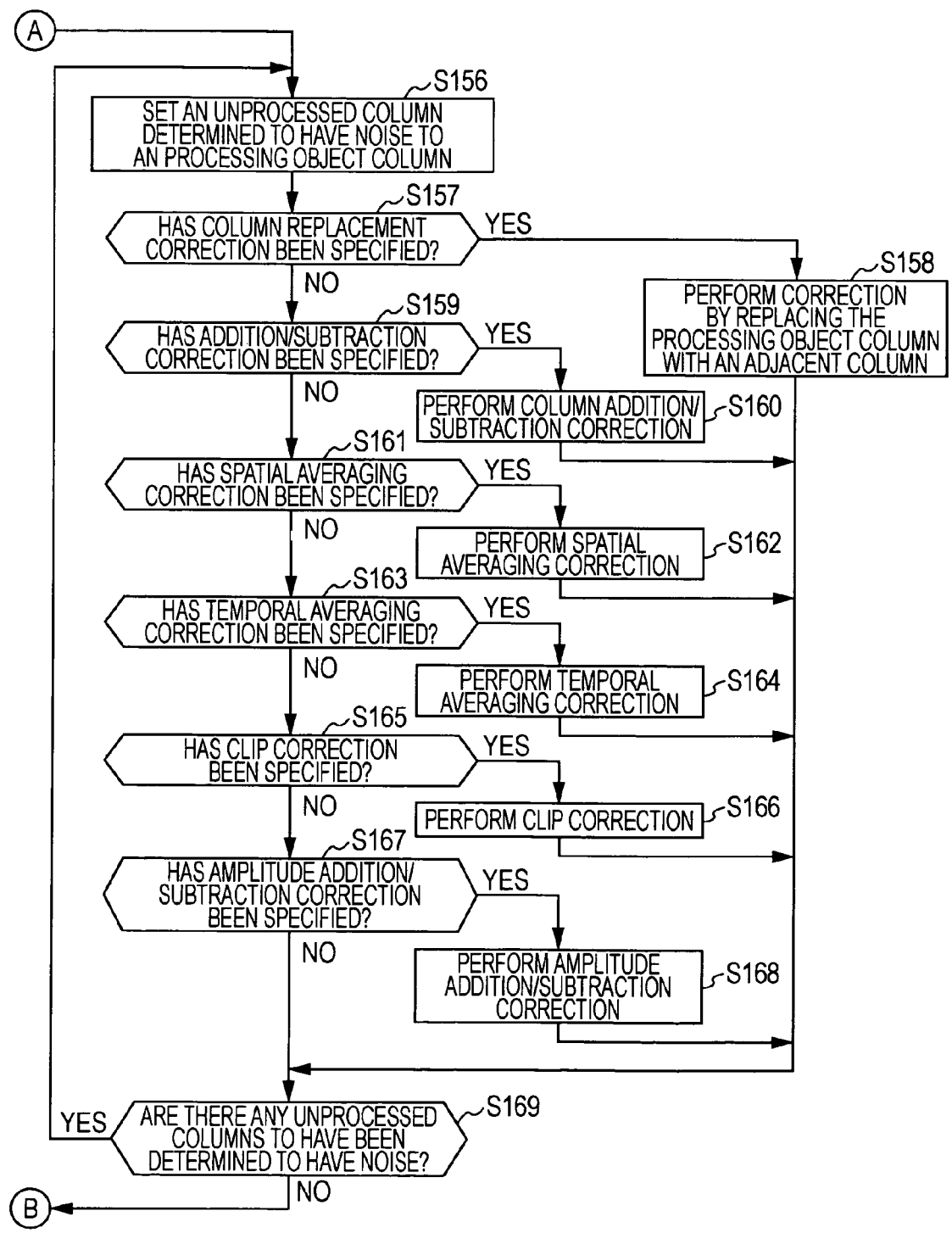
FIG. 8 is a flowchart for describing random-noise correction processing.

Now, the noise correction processing will be described with reference to the flowchart in FIG. 8.

In step S141, the noise correcting unit 18 determines whether noise correction is performed in pixel units or column units by unshown setting operations. For example, in the event that determination is made step S141 that correction is set so as to be performed in pixel units by unshown setting operations the processing proceeds to step S142.

In step S142, the pixel-units processing unit 153 accesses the noise database 17 to set, of pixels corresponding to addresses registered as a pixel where random noise has occurred, a pixel corresponding to an unprocessed address to the processing object pixel.

In step S143, the pixel replacement correcting unit 178 determines whether or not pixel replacement correction has been instructed. In the event that determination is made in step S143 that pixel replacement correction has been instructed, the pixel replacement correcting unit 178 replaces the pixel value of the processing object pixel with an arbitrary pixel of a total eight pixels adjacent to the upper, lower, left and right, and upper right, lower right, upper left, and lower left of the processing object pixel, respectively. Alternatively, the pixel replacement correcting unit 178 replaces the pixel value of the processing object pixel with a mean pixel value of a total eight adjacent pixels, for example. Further, alternatively, the pixel replacement correcting unit 178 replaces the pixel value of the processing object pixel with a median value of a total eight adjacent pixels, for example. In this case, the pixel replacement correcting unit 178 substantially serves as a median filter. Upon the pixel value being corrected, the processing proceeds to step S155.

In the event that determination is made in step S143 that pixel replacement correction has not been instructed, in step S145 the pixel addition/subtraction correcting unit 179 determines whether or not pixel addition/subtraction correction has been instructed. In the event that determination is made in step S145 that pixel addition/subtraction correction has been instructed by unshown setting operations, the processing proceeds to step S146.

In step S146, the pixel addition/subtraction correcting unit 179 adds/subtracts the pixel value of the processing object pixel to/from an arbitrary pixel of a total eight pixels adjacent to the upper, lower, left and right, and upper right, lower right, upper left, and lower left of the processing object pixel, for example. Note that addition or subtraction mentioned here is depending on the amplitude, wherein when the amplitude is a positive, subtraction is performed, and when the amplitude is negative, addition is performed. Alternatively, the pixel addition/subtraction correcting unit 179 adds/subtracts the pixel value of the processing object pixel to/from a mean pixel value in a total eight adjacent pixels, for example. Further, alternatively, the pixel addition/subtraction correcting unit 179 adds/subtracts the pixel value of the processing object pixel to/from a median pixel value in a total eight adjacent pixels, for example. Upon the pixel value being corrected, the processing proceeds to step S155.

In the event that determination is made in step S145 that pixel addition/subtraction correction has not been instructed, in step S147 the pixel space averaging correcting unit 180 determines whether or not space averaging correction has been instructed. In the event that determination is made in step S147 that pixel space averaging correction has been instructed by unshown setting operations, the processing proceeds to step S148.

In step S148, the pixel space averaging correcting unit 180 corrects the pixel value of the processing object pixel with a spatial mean value of a total eight pixels adjacent to the upper, lower, left and right, and upper right, lower right, upper left, and lower left of the processing object pixel, and the pixel value of the processing object pixel, for example. That is to say, in this case, the pixel space averaging correcting unit 180 substantially serves as an LPF (Low Pass Filter). Alternatively, the pixel space averaging correcting unit 180 corrects the pixel value of the processing object pixel with a mean pixel value of a total eight adjacent pixels, and further a spatial mean value of adjacent 16 pixels and the processing object pixel, according to the amplitude of noise, for example. That is to say, the pixel space averaging correcting unit 180 changes a range including the processing object pixel from which a spatial mean value is obtained, according to the amplitude of noise. Thus, upon the pixel value being corrected, the processing proceeds to step S155.

Also, in the event that determination is made in step S147 that pixel space averaging correction has not been instructed, in step S149 the pixel time averaging correcting unit 181 determines whether or not time averaging correction has been instructed. In the event that determination is made in step S149 that pixel time averaging correction has been instructed by unshown setting operations for example, the processing proceeds to step S150.

In step S150, the pixel time averaging correcting unit 181 corrects the pixel value of the processing object pixel with a temporal mean value of the pixel values of the pixel of the same position of the previous and subsequent frames of the processing object pixel, and the processing object pixel, for example. Alternatively, the pixel space averaging correcting unit 180 corrects the processing object pixel with an averaged pixel value of pixels at the same position of adjacent two or more frames according to the amplitude of noise, for example. Upon the pixel value being corrected, the processing proceeds to step S155.

Further, in the event that determination is made in step S149 that pixel time averaging correction has not been instructed, in step S151 the pixel clip correcting unit 182 determines whether or not pixel clip correction has been instructed. In the event that determination is made in step S151 that pixel clip correction has been instructed by unshown setting operations, the processing proceeds to step S152.

In step S152, the pixel clip correcting unit 182 corrects, in the event that the image is an image at the time of dark for example, the pixel value of the processing object pixel with the maximum value of a black level, or the like. Alternatively, the pixel clip correcting unit 182 clips the pixel value of the processing object pixel, for example, with a mean value of adjacent eight pixels, a pixel value around the median value of the standard deviations of the pixel values of all the pixels within an image, or the like. Upon the pixel value being corrected, the processing proceeds to step S155.

Also, in the event that determination is made in step S151 that pixel clip correction has not been instructed, in step S153 the pixel noise amplitude addition/subtraction correcting unit 177 determines whether or not amplitude addition/subtraction correction has been instructed. In the event that determination is made in step S153 that amplitude addition/subtraction correction has been instructed by unshown setting operations, the processing proceeds to step S154.

In step S154, the pixel noise amplitude addition/subtraction correcting unit 177 corrects the processing object pixel by adding/subtracting the amplitude registered in the noise database 17. Alternatively, for example, when difference between the pixel value of the processing object pixel, and the pixel values of peripheral pixels is greater than a predetermined value, the pixel noise amplitude addition/subtraction correcting unit 177 corrects the pixel value of the processing object pixel by adding/subtracting the amplitude of the noise registered in the noise database 17. Upon the pixel value being corrected, the processing proceeds to step S155.

Further, in the event that determination is made in step S153 that amplitude addition/subtraction correction has not been instructed, the processing proceeds to step S155.

In step S155, the pixel-units processing unit 153 determines whether or not there is a pixel corresponding to an unprocessed address of the pixels corresponding to an address registered in the noise database 17 as a pixel where random noise has occurred. For example, in the event that determination is made in step S155 that there is an unprocessed pixel, the processing returns to step S142. That is to say, of the pixels corresponding to an address registered as a pixel where random noise has occurred, the processing in steps S142 through S155 is repeated until there is no pixel corresponding to an unprocessed address. Subsequently, in the event that determination is made in step S155 that there is no unprocessed pixel, the processing ends.

On the other hand, in the event that determination is made in step S141 that correction has been set to be performed not in pixel units but in column units by unshown setting operations, the processing proceeds to step S156.

In step S156, the column-units processing unit 154 accesses the noise database 17 to set, of the columns corresponding to an address registered as a column where random noise has occurred, a column corresponding to an unprocessed address to the processing object column.

In step S157, the column replacement correcting unit 207 determines whether or not column replacement correction has been instructed. In the event that determination is made in step S157 that column replacement correction has been instructed by unshown setting operations, the processing proceeds to step S158.

The column replacement correcting unit 207 replaces the pixel values of pixels in the processing object column with the pixel value of a pixel adjacent to either the left or right of the processing object column, for example. Alternatively, the column replacement correcting unit 207 replaces the pixel values in the processing object column with a mean pixel value of each pixel in a total three adjacent columns, for example. Further, alternatively, the column replacement correcting unit 207 replaces the pixel values of pixels in the processing object column with a median value of the pixel values of pixels in multiple adjacent columns, for example. In this case, the column replacement correcting unit 207 substantially serves as a median filter. Upon the pixel values being corrected, the processing proceeds to step S169.

In the event that determination is made in step S157 that column replacement correction has not been instructed, in step S159 the column addition/subtraction correcting unit 208 determines whether or not column addition/subtraction correction has been instructed. In the event that determination is made in step S159 that column addition/subtraction correction has been instructed by unshown setting operations for example, the processing proceeds to step S160.

In step S160, the column addition/subtraction correcting unit 208 adds/subtracts the pixel values in an arbitrary column of a total three columns including the left and right of the processing object column and an adjacent column to/from the pixel values in the processing object column, for example. Alternatively, the column addition/subtraction correcting unit 208 adds/subtracts a mean pixel value of a total three columns including an adjacent column to/from the pixel values in the processing object column, for example. Further, alternatively, the column addition/subtraction correcting unit 208 adds/subtracts a median value of the pixel values of a total three adjacent columns to/from the pixel values in the processing object column, for example. Upon the pixel values being corrected, the processing proceeds to step S169.

In the event that determination is made in step S159 that column addition/subtraction correction has not been instructed, in step S161 the column space averaging correcting unit 209 determines whether or not column space averaging correction has been instructed. In the event that determination is made in step S161 that column space averaging correction has been instructed by unshown setting operations for example, the processing proceeds to step S162.

In step S162, the column space averaging correcting unit 209 corrects the pixel values in the processing object column with a spatial mean value of the pixel values of a total three columns adjacent to the processing object column, and the processing object column, for example. In this case, the column space averaging correcting unit 209 substantially serves as an LPF. Alternatively, the column space averaging correcting unit 209 corrects the pixel values in the processing object column with a column spatial mean value by a mean pixel value to be obtained by changing the number of adjacent columns according to the amplitude of noise, for example. Upon the pixel values being corrected, the processing proceeds to step S169.

Also, in the event that determination is made in step S161 that column space averaging correction has not been instructed, in step S163 the column time averaging correcting unit 210 determines whether or not column time averaging correction has been instructed. In the event that determination is made in step S163 that column time averaging correction has been instructed by unshown setting operations for example, the processing proceeds to step S164.

In step S164, the column time averaging correcting unit 210 corrects the pixel values in the processing object column with a temporal mean value of the pixel values of the columns at the same positions of the previous and subsequent frames of the processing object column, and the processing object column, for example. Alternatively, the column space averaging correcting unit 209 corrects the processing object column with a mean pixel value of the columns at the same positions of adjacent two or more frames according to the amplitude of noise, for example. Upon the pixel values being corrected, the processing proceeds to step S169.

Further, in the event that determination is made in step S163 that column time averaging correction has not been instructed, in step S165 the column clip correcting unit 211 determines whether or not column clip correction has been instructed. In the event that determination is made in step S165 that column clip correction has been instructed by unshown setting operations for example, the processing proceeds to step S166.

For example, in the event that the image is an image at the time of dark, in step S166 the column clip correcting unit 211 corrects the pixel values in the processing object column with the maximum value in a black level, or the like. Alternatively, the column clip correcting unit 211 clips the pixel values in the processing object column with a mean value of a total three columns including an adjacent column, or a pixel value around a median value of the standard deviations of the pixel values of all the columns within the image, for example. Upon the pixel values being corrected, the processing proceeds to step S169.

Also, in the event that determination is made in step S165 that column clip correction has not been instructed, in step S167 the column noise amplitude addition/subtraction correcting unit 206 determines whether or not column amplitude addition/subtraction correction has been instructed. In the event that determination is made in step S167 that column amplitude addition/subtraction correction has been instructed by unshown setting operations for example, the processing proceeds to step S168.

In step S168, the column noise amplitude addition/subtraction correcting unit 206 corrects the pixel values in the processing object column by adding/subtracting the amplitude registered in the noise database 17, for example. Alternatively, when the mean value of difference of the pixel values in the processing object column, and the pixel values in a peripheral column is greater than a predetermined value, the column noise amplitude addition/subtraction correcting unit 206 corrects the pixel values in the processing object column by adding/subtracting the amplitude of the noise registered in the noise database 17. Upon the pixel values being corrected, the processing proceeds to step S169.

Further, in the event that determination is made in step S167 that column amplitude addition/subtraction correction has not been instructed, the processing proceeds to step S169.

In step S169, the column-units processing unit 154 determines whether or not, of the pixels corresponding to an address registered in the noise database 17 as a column where random noise has occurred, there is a column corresponding to an unprocessed address. In the event that determination is made in step S169 that there is an unprocessed column, the processing returns to step S156. That is to say, of the pixels corresponding to an address registered as a pixel where random noise has occurred, the processing in steps S156 through S169 is repeated until there is no pixel corresponding to an unprocessed address. In the event that determination is made in step S169 that there is no unprocessed column, the processing ends.

According to the above processing, a pixel or a column alone where the random noise registered in the noise database 17 has been detected is monitored, and in the event that random noise has been detected, in pixel units or in column units, the pixel or column may be subjected to pixel, replacement correction, addition/subtraction correction, space averaging correction, time averaging correction, clip correction, amplitude addition/subtraction correction, or may be output without correction. Also, with the flowchart in FIG. 8, output without correction is included, but the pixel or column may successively be corrected in one of the states.

Now, description will return to the flowchart in FIG. 6.

In step S104, the noise correcting unit 18 outputs and displays an image of which the noise has been removed by executing noise correction processing to the display unit 2, and the processing ends.

According to the above processing, an image equivalent to the time of dark or an image at the time of dark is imaged, and the noise database 17 is registered in pixel units or in column units, and even in the event that random noise has occurred at the time of imaging, a pixel or column may suitably be corrected based on the information of the noise database 17, and accordingly, random noise can be reduced.

2. Second Embodiment

Also, with the above embodiment, an example has been described wherein the imaging apparatus 1 generates the noise database 17, and corrects an image imaged by itself, but such as illustrated in FIG. 9, an arrangement may be made wherein the noise database 17 is stored in, for example, a personal computer 302 other than the imaging apparatus 1, and correction is performed on the personal computer 302. Specifically, the imaging apparatus 301 in FIG. 9 has a configuration obtained by eliminating the noise data obtaining unit 16, the noise database 17, and the noise correcting unit 18 from the imaging apparatus 1 shown in FIG. 1. Also, with the personal computer 302, a noise database 311 generated in the same way as the noise database 17, and the noise correcting unit 18 are provided. Therefore, the imaging apparatus 301 outputs an imaged image to the personal computer 302. Subsequently, the noise correcting unit 18 of the personal computer 302 uses the noise database 311 to correct the image to be supplied from the imaging apparatus 301, and displays this on the display unit 2.

Note that, with the image apparatus 301 and the personal computer 302 in FIG. 9, configurations having the same function as with the imaging apparatus 1 in FIG. 1 are denoted the same reference numeral. Also, the specific imaging processing is the same as with the above imaging apparatus 1 alone, and description thereof will be omitted.

According to the above, with a CMOS solid-state imaging device formed of a semiconductor, noise due to a defective pixel outputting a peculiar-level signal at random, i.e., random noise is measured beforehand according to the property of each of the individual transistors to be used, and thus, a noise database is generated. Subsequently, an imaged image is corrected based on the information of the noise database, whereby random noise can be reduced.

Incidentally, the above-described series of processing can be executed by hardware of by software. In the event that the series of processing is performed by software, a program making up the software thereof is installed from a recording medium to a computer built into dedicated hardware, or a general-purpose personal computer or the like capable of executing various functions by installing various types of programs, for example.

FIG. 10 illustrates a configuration example of the general-purpose personal computer. This personal computer houses a CPU (Central Processing Unit) 1001. An input/output interface 1005 is connected to the CPU 1001 via a bus 1004. ROM (Read Only Memory) 1002 and RAM (Random Access Memory) 1003 are connected to the bus 1004.

An input unit 1006 made up of an input device such as a keyboard, mouse, or the like for a user inputting an operation command, an output unit 1007 for outputting a processing operation screen or an image of processing results to a display device, a storage unit 1008 made up of a hard disk drive or the like which stores a program or various types of data, and a communication unit 1009 made up of a LAN (Local Area Network) adapter or the like which executes communication processing via a network, of which the Internet is representative, are connected to the input/output interface 1005. Also, a drive 1010 for reading/writing data as to a removable medium 1011 such as a magnetic disk (including flexible disks), optical discs (including CD-ROM (Compact Disc-Read Only Memory), DVD (Digital Versatile Disc)), magneto-optical disks (including MD (Mini Disc), semiconductor memory, or the like is also connected to the input/output interface 1005.

The CPU 1001 executes various types of processing in accordance with a program stored in the ROM 1002, or a program read out from the removable medium 1011 such as a magnetic disk, optical disc, magneto-optical disk, semiconductor memory, or the like, installed in the storage unit 1008, and loaded from the storage unit 1008 to the RAM 1003. Data used for the CPU 1001 executing various types of processing, or the like is stored in the RAM 1003 as appropriate.

It should be noted that with the Present Specification, steps describing the program to be recorded in a recording medium include processing to be performed in the time-sequence following the described order, and also include processing not necessarily performed in the time-sequence but performed in parallel or individually.

The present application contains subject matter related to that disclosed in Japanese Priority Patent Application JP 2009-217719 filed in the Japan Patent Office on Sep. 18, 2009, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An imaging apparatus comprising:
   imaging means configured to capture an image using an imaging device;
   image obtaining means configured to obtain a plurality of images equivalent to a time of dark, imaged by said imaging means;
   registering means configured to register, with an image obtained by said image obtaining means, an address and a change amount of a pixel where an output value of said pixel changes, within the plurality of images equivalent to the time of dark, so as to exceed a predetermined threshold; and
   correcting means configured to correct, when taking a pixel corresponding to an address registered by said registering means as a processing object pixel, a pixel value of said processing object pixel based on comparison between a difference of the output values of said processing object pixel and a pixel peripheral to said processing object pixel, and the change amount of said processing object pixel.

2. The imaging apparatus according to claim 1, wherein said image obtaining means obtain a plurality of images at the time of dark, imaged by said imaging means.

3. The imaging apparatus according to claim 2, further comprising:
generating means configured to generate, with an image obtained by said image obtaining means, the pixel value of a pixel, and a statistical processing value using said pixel value in pixel units; and
detecting means configured to detect a pixel which transmits a peculiar signal based on the pixel value and the statistical processing value, generated by said generating means;
wherein said image obtaining means change a transfer gate of said imaging device to an off state to obtain a plurality of images at the time of dark;
and wherein said registering means registers the change amount comprising the amplitude of a pixel including said peculiar signal, and a time constant at which said peculiar signal is generated, in a manner correlated with an address for determining said pixel in pixel units where said peculiar signal detected by said detecting means has been detected, as a database.

4. The imaging apparatus according to claim 2, wherein said image obtaining means turn a transfer gate of said imaging device to an off state to obtain a plurality of images at the time of dark;
and wherein said generating means generate, with an image obtained by said image obtaining means, the pixel value of a pixel, and a statistical processing value using said pixel value in column units;
and wherein said detecting means detect a pixel transmitting a peculiar signal based on the pixel value and the statistical processing value in column units, generated by said generating means;
and wherein said registering means register the amplitude of a pixel including said peculiar signal, and a time constant at which said peculiar signal is generated in a manner correlated with an address for determining said pixel in column units where said peculiar signal detected by said detecting means has been detected, as a database.

5. The imaging apparatus according to any one of claims 2 through 4, wherein said image obtaining means obtain a plurality of images equivalent to the time of dark at a time of low temperature by said imaging means.

6. The imaging apparatus according to claim 3, further comprising:
determining means configured to determine, when taking a pixel corresponding to an address registered in said database as a processing object, based on information registered in a manner correlated with an address in said database, an existence of said peculiar signal based on whether or not the pixel value of said processing object pixel exceeds a predetermined threshold set to a statistical processing value, or whether or not a difference between the pixel values of said adjacent pixels exceeds the amplitude registered in said database or a predetermined threshold.

7. The imaging apparatus according to claim 6, wherein said determining means determine, when taking a pixel corresponding to an address registered in said database as a processing object, an existence of said peculiar signal based on whether or not the difference between the pixel values of said adjacent pixels exceeds a predetermine threshold, whether or not a difference between the patterns of pixels having a predetermined positional relation corresponding to the pixel serving as said processing object exceeds a predetermined threshold, or whether or not difference between the pixels of frames or fields exceeds a predetermined threshold at the time of continuous shootings and at the time of a moving image.

8. The imaging apparatus according to claim 4, wherein said determining means determine, when taking a pixel in a column corresponding to an address registered in said database as a processing object, based on information registered in said database in a manner correlated with the address, an existence of said peculiar signal based on whether or not the pixel value of the pixel in said processing object column exceed a predetermined threshold set to a statistical processing value, or whether or not a difference between the pixel values of pixels in said adjacent columns exceeds the amplitude registered in said database or a predetermined threshold.

9. The imaging apparatus according to claim 8, wherein said determining means determine, when taking a pixel in a column corresponding to an address registered in said database as a processing object, an existence of said peculiar signal based on whether or not difference between the pixel values of pixels in said adjacent columns exceeds a predetermined threshold, whether or not difference between the patterns of pixels in columns having a predetermined positional relation corresponding to the pixel in the column serving as said processing object exceeds a predetermined threshold, whether or not difference between pixels in the columns of frames or fields exceeds a predetermined threshold when shooting in succession or when shooting moving images, whether or not a difference between pixels of the same position in adjacent columns exceeds a predetermined threshold, whether or not a difference between pixels vertically adjacent to the vertical direction of the pixels in said column exceeds a predetermined threshold, or whether or not the pattern in the vertical direction of the pixel values of the pixels in said columns greatly differs exceeding a predetermined threshold within a predetermined range.

10. The imaging apparatus according to claim 3, wherein said correcting means corrects the pixel value of a pixel determined to have said peculiar signal by addition/subtraction processing using a correction value obtained by being corrected with luminance using the value of the amplitude registered in said database, replacement with the pixel value of an adjacent pixel, addition/subtraction of the output of an adjacent pixel, spatial averaging, temporal averaging, or clip processing to a predetermined value.

11. The imaging apparatus according to claim 4, wherein said correcting means corrects the pixel value of a pixel in said column units determined to have a peculiar signal, or the pixel of a location where said peculiar signal occurs within said column.

12. The imaging apparatus according to claim 11, wherein said correcting means correct, based on the information registered in said database, a pixel value by complementing the pixel of said column unit determined to have said peculiar signal with an adjacent column, or by performing addition/subtraction processing using the amplitude registered in said database.

13. The imaging apparatus according to claim 11, wherein said correcting means correct, with correction as to a location where a peculiar signal occurs within said column, the pixel value of a pixel determined to have said peculiar signal by complementation with the same location as an adjacent column, addition/subtraction of the output of the same location as an adjacent column, spatial averaging, temporal averaging, clip processing to a particular value.

14. An information processing device comprising:
a database in which, in a manner correlated with an address determining a pixel where a peculiar signal has been detected, the amplitude of a pixel including said peculiar signal, and a time constant where said peculiar signal occurs are registered by said registering means according to claim 1;
determining means configured to determine, when taking a pixel corresponding to an address registered in said database as a processing object regarding an image imaged by said imaging means according to claim 1, an existence of said peculiar signal based on the distribution of the pixel value of a pixel having a predetermined positional relation corresponding to said processing object pixel, or difference between the pixel values of adjacent pixels; and
correcting means configured to correct the pixel value of a pixel determined to have a particular signal by said determining means.

15. An imaging method comprising the steps of:
capturing of an image using an imaging device;
obtaining of a plurality of images equivalent to a time of dark, imaged in said capturing;
registering, with an image obtained in said obtaining, of an address and a change amount of a pixel where the output value of said pixel changes, within the plurality of images equivalent to the time of dark, so as to exceed a predetermined threshold; and
correcting, when taking a pixel corresponding to an address registered in said registering as a processing object pixel, of a pixel value of said processing object pixel based on a comparison between a difference of the output values of said processing object pixel and a pixel peripheral to said processing object pixel, and the change amount of said processing object pixel.

16. A program for causing a computer to execute processing, the program being stored on a non-transitory computer readable medium and being executed to perform operations comprising:
capturing of an image using an imaging device;
obtaining of a plurality of images equivalent to a time of dark, imaged in said capturing;
registering, with an image obtained in said obtaining, of an address and a change amount of a pixel where the output value of said pixel changes, within the plurality of images equivalent to the time of dark, so as to exceed a predetermined threshold; and
correcting, when taking a pixel corresponding to an address registered in said registering as a processing object pixel, of a pixel value of said processing object pixel based on a comparison between a difference of the output values of said processing object pixel and a pixel peripheral to said processing object pixel, and the change amount of said processing object pixel.

17. An electronic device comprising:
imaging means configured to capture an image using an imaging device;
image obtaining means configured to obtain a plurality of images equivalent to a time of dark, imaged by said imaging means;
registering means configured to register, with an image obtained by said image obtaining means, an address and a change amount of a pixel where the output value of said pixel changes, within the plurality of images equivalent to the time of dark, so as to exceed a predetermined threshold; and
correcting means configured to correct, when taking a pixel corresponding to an address registered by said registering means as a processing object pixel, a pixel value of said processing object pixel based on a comparison between a difference of the output values of said processing object pixel and a pixel peripheral to said processing object pixel, and the change amount of said processing object pixel.

18. An imaging apparatus comprising:
an imaging unit configured to capture an image using an imaging device;
an image obtaining unit configured to obtain a plurality of images equivalent to a time of dark, imaged by said imaging unit;
a registering unit configured to register, with an image obtained by said image obtaining unit, an address and a change amount of a pixel where the output value of said pixel changes, within the plurality of images equivalent to the time of dark, so as to exceed a predetermined threshold; and
a correcting unit configured to correct, when taking a pixel corresponding to an address registered by said registering unit as a processing object pixel, a pixel value of said processing object pixel based on a comparison between a difference of the output values of said processing object pixel and a pixel peripheral to said processing object pixel, and the change amount of said processing object pixel.

19. An electronic device comprising:
an imaging unit configured to capture an image using an imaging device;
an image obtaining unit configured to obtain a plurality of images equivalent to a time of dark, imaged by said imaging unit;
a registering unit configured to register, with an image obtained by said image obtaining unit, an address and a change amount of a pixel where the output value of said pixel changes, within the plurality of images equivalent to the time of dark, so as to exceed a predetermined threshold; and
a correcting unit configured to correct, when taking a pixel corresponding to an address registered by said registering unit as a processing object pixel, a pixel value of said processing object pixel based on a comparison between a difference of the output values of said processing object pixel and a pixel peripheral to said processing object pixel, and the change amount of said processing object pixel.

* * * * *